(12) United States Patent
Agarwal et al.

(10) Patent No.: US 10,257,670 B2
(45) Date of Patent: Apr. 9, 2019

(54) PORTABLE DEVICE AND METHOD FOR PROVIDING NOTICE INFORMATION THEREOF

(71) Applicant: SAMSUNG ELECTRONICS CO., LTD., Suwon-si (KR)

(72) Inventors: Pankaj Agarwal, Suwon-si (KR); Chang-yeong Kim, Seoul (KR); Ji-su Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/096,516

(22) Filed: Apr. 12, 2016

(65) Prior Publication Data

US 2016/0309307 A1   Oct. 20, 2016

Related U.S. Application Data

(60) Provisional application No. 62/148,383, filed on Apr. 16, 2015.

(30) Foreign Application Priority Data

Jun. 18, 2015   (KR) .................. 10-2015-0086853

(51) Int. Cl.
*H04W 4/12* (2009.01)
*G06F 1/16* (2006.01)
(Continued)

(52) U.S. Cl.
CPC .............. *H04W 4/12* (2013.01); *G06F 1/163* (2013.01); *G06F 3/04886* (2013.01); *G08B 5/22* (2013.01);
(Continued)

(58) Field of Classification Search
CPC ...... H04W 4/12; G06F 3/04886; G06F 1/163; H04M 1/7253; H04M 3/436;
(Continued)

(56) References Cited

U.S. PATENT DOCUMENTS

| 8,532,721 B2 | 9/2013 | Griffin |
| 2009/0144661 A1 | 6/2009 | Nakajima et al. |

(Continued)

FOREIGN PATENT DOCUMENTS

| KR | 10-2007-0105019 A | 10/2007 |
| KR | 10-2009-0132140 A | 12/2009 |

(Continued)

OTHER PUBLICATIONS

Communication dated Mar. 12, 2018, issued by the European Patent Office in counterpart European Application No. 16780335.2.
(Continued)

*Primary Examiner* — Marcos L Torres
(74) *Attorney, Agent, or Firm* — Sughrue Mion, PLLC

(57) ABSTRACT

A portable device providing notice information and a method for providing the notice information thereof are provided. The portable device includes a display configured to be divided into areas respectively corresponding to types of notice information, and a controller configured to sense an event corresponding to the notice information, and control the display to activate pixels included in an area corresponding to a type of the notice information, and inactivate pixels included in an area not corresponding to the type of the notice information, among the areas, in response to the controller sensing the event.

18 Claims, 39 Drawing Sheets

(51) Int. Cl.
| | |
|---|---|
| *H04M 1/725* | (2006.01) |
| *G06F 3/0488* | (2013.01) |
| *G08B 5/22* | (2006.01) |
| *G08B 7/06* | (2006.01) |
| *G09G 3/00* | (2006.01) |
| *G09G 3/20* | (2006.01) |
| *G08B 21/18* | (2006.01) |
| *H04L 12/58* | (2006.01) |
| *H04B 1/3827* | (2015.01) |

(52) U.S. Cl.
CPC .............. *G08B 7/06* (2013.01); *G08B 21/18* (2013.01); *G09G 3/00* (2013.01); *G09G 3/20* (2013.01); *H04M 1/7253* (2013.01); *G09G 2340/145* (2013.01); *G09G 2354/00* (2013.01); *G09G 2380/00* (2013.01); *H04B 2001/3861* (2013.01); *H04L 51/24* (2013.01); *H04M 1/72544* (2013.01); *H04M 1/72547* (2013.01); *H04M 1/72552* (2013.01); *H04M 1/72597* (2013.01); *H04M 2250/22* (2013.01)

(58) Field of Classification Search
CPC ......... H04M 1/72547; H04M 2250/22; H04M 1/72552; H04M 1/72544; H04M 1/72597; H04L 51/24; H04B 2001/3861; G08B 21/18; G08B 5/22; G08B 7/06; G09G 3/20; G09G 3/00; G09G 2340/145; G09G 2534/00; G09G 2380/00
See application file for complete search history.

(56) References Cited

U.S. PATENT DOCUMENTS

| | | |
|---|---|---|
| 2013/0178248 A1 | 7/2013 | Kim |
| 2013/0300697 A1 | 11/2013 | Kim et al. |
| 2014/0344375 A1 | 11/2014 | Hauser et al. |
| 2015/0155903 A1* | 6/2015 | Jang .................... H04B 1/3888 455/575.8 |

FOREIGN PATENT DOCUMENTS

| | | |
|---|---|---|
| KR | 10-2013-0075340 A | 7/2013 |
| KR | 10-2014-0047972 A | 4/2014 |
| KR | 10-2014-0113155 A | 9/2014 |
| WO | 2014/142412 A1 | 9/2014 |

OTHER PUBLICATIONS

Written Opinion (PCT/ISA/237) dated Jul. 25, 2016 issued by the International Searching Authority in International Application No. PCT/KR2016/003972.

International Search Report (PCT/ISA/210) dated Jul. 25, 2016 issued by the International Searching Authority in International Application No. PCT/KR2016/003972.

Communication dated Oct. 5, 2018, issued by the European Patent Office in counterpart European Application No. 16780335.2.

\* cited by examiner (a)　　　　　　　　　　(b)

| Group | Pixel area | Notification Type | Notification Color |
|---|---|---|---|
| Basic | (0, 0)-(119, 159) | Static | White |
| Call/Calendar | (120, 0)-(239, 159) | Blinking | White |
| SNS | (0, 160)-(119, 319) | Blinking | Blue |
| Message | (120, 160)-(239, 319) | Animation | Red |

FIG. 5A
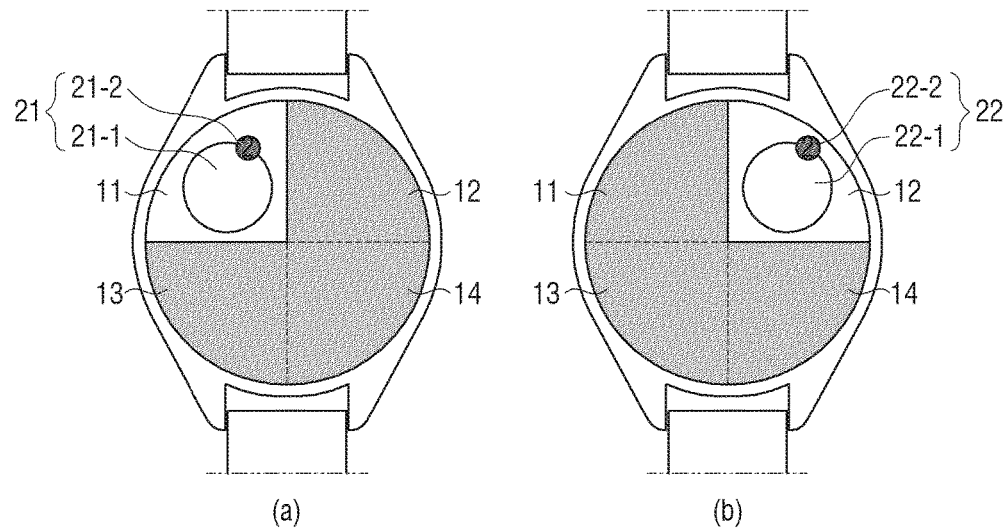
(a)  (b)
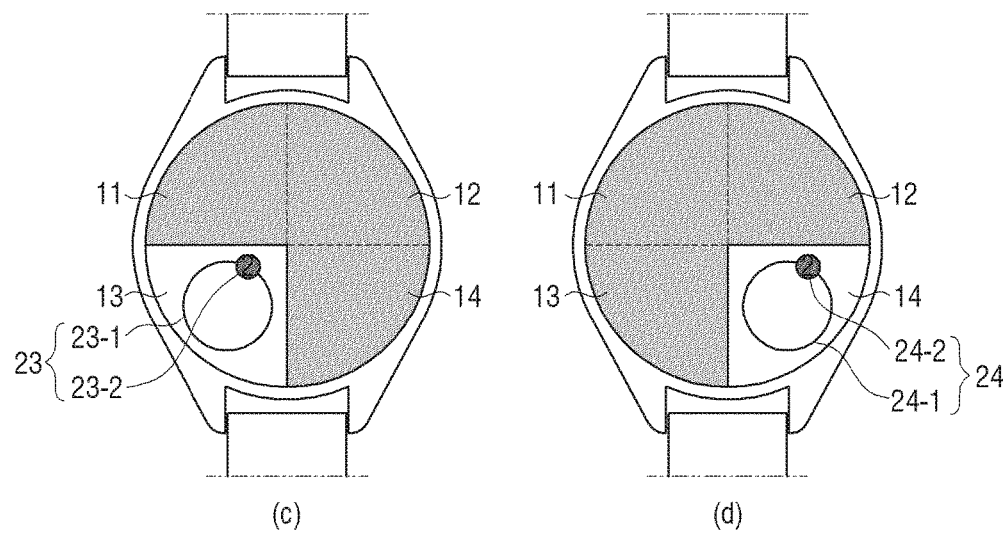
(c)  (d)

FIG. 5B
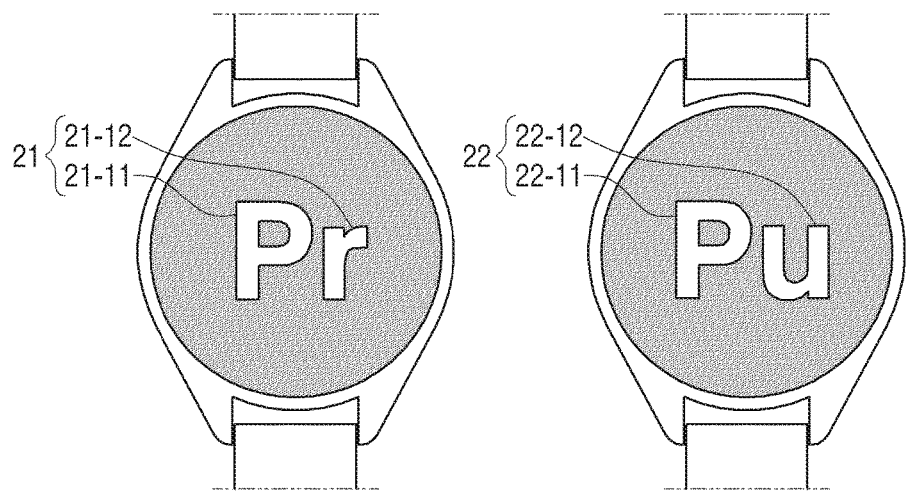
(a)  (b)
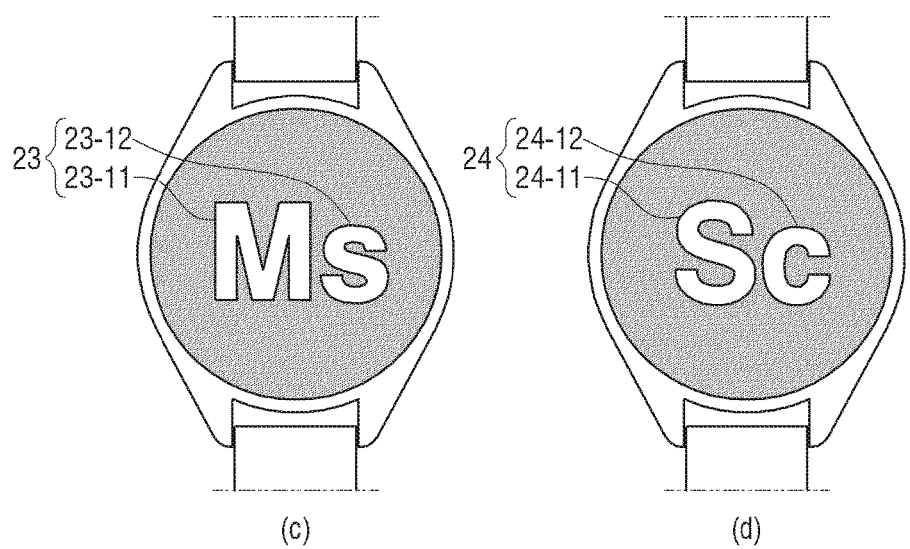
(c)  (d)

FIG. 5C
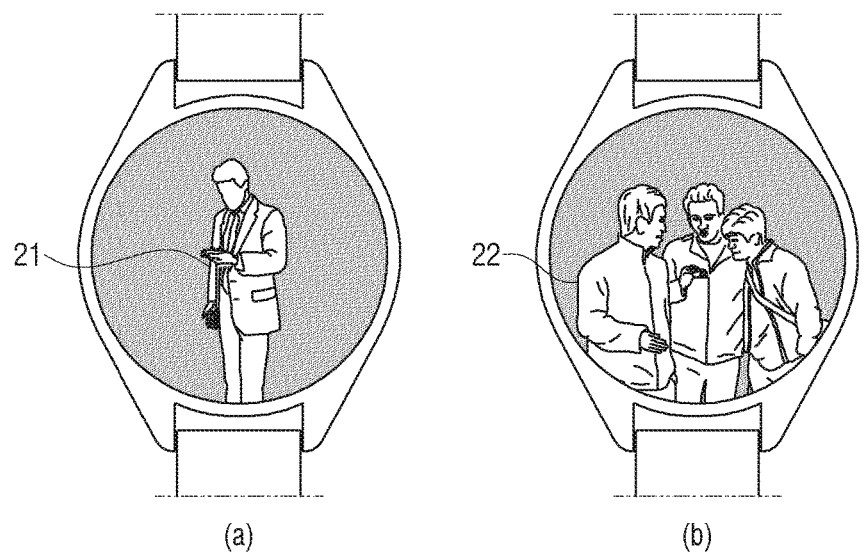
(a)  (b)
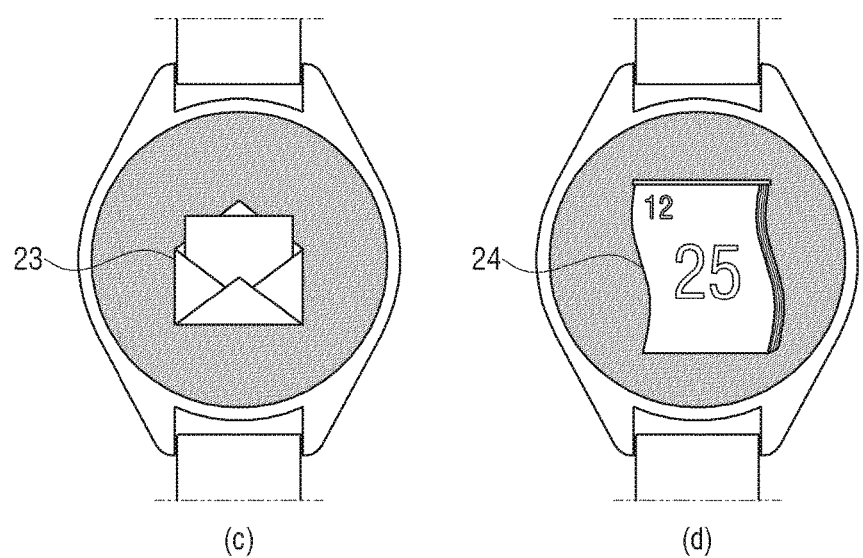
(c)  (d)

(a)  (b)

(c)

(g)  (h)

(i)　　　　　　　　　　　　(j)

(c)　　　　　　　　　　(d)

PORTABLE DEVICE AND METHOD FOR PROVIDING NOTICE INFORMATION THEREOF

CROSS-REFERENCE TO RELATED APPLICATIONS

This application claims priority from U.S. Provisional Application No. 62/148,383, filed on Apr. 16, 2015 in the U.S. Patent & Trademark Office, and Korean Patent Application No. 10-2015-0086853, filed on Jun. 18, 2015 in the Korean Intellectual Property Office, the disclosures of which are incorporated herein by reference in their entireties.

BACKGROUND

1. Field

Apparatuses and methods consistent with exemplary embodiments relate to a portable device providing notice information and a method for providing the notice information thereof, and more specifically, to a portable device providing various types of notice information on a screen and a method for providing the notice information thereof.

2. Description of the Related Art

Development in the mobile communication technology enables provision of various types of portable device such as smart phones, wearable devices or tablet PCs, which may provide information to a user through various outputting methods.

For example, a portable device may provide notice information indicating the status of the portable device and the notice information received by the communication system, through a display or a speaker.

The notice information may include various types of information such as phone reception information, message reception information, or alarm information set by a user.

Herein, various additional information may be included in the notice information. For example, the message reception information may include sender identification information regarding a counterpart who sends a message, and content of the message. Further, the notice information may include the alarm time and user schedules related with the alarm. Further, the phone reception information may include caller identification information of a counterpart who is making a phone call.

When a portable device provides notice information, notice information may include private information of a user. For example, message reception information may include the private message descriptions of a user. In this case, when a user is adjacent to a third party, the private descriptions of a user may be exposed to the third party.

Further, due to the diverse nature of types of the notice information, the portable device may receive the notice information indiscriminately. When a user is working on his job, indiscriminate reception of the notice information may deteriorate the concentration on the work.

SUMMARY

Exemplary embodiments address at least the above problems and/or disadvantages and other disadvantages not described above. Also, the exemplary embodiments are not required to overcome the disadvantages described above, and may not overcome any of the problems described above.

One or more exemplary embodiments provide a portable device providing notice information and a method for providing the notice information thereof, which minimize the exposure of the notice information and also selectively provide the notice information, when providing the notice information to a user.

According to an aspect of an exemplary embodiment, there is provided a portable device configured to provide notice information, the portable device including a display configured to be divided into areas respectively corresponding to types of notice information, and a controller configured to sense an event corresponding to the notice information, and control the display to activate pixels included in an area corresponding to a type of the notice information, and inactivate pixels included in an area not corresponding to the type of the notice information, among the areas, in response to the controller sensing the event.

The area corresponding to the type of the notice information may correspond to a group to which the notice information belongs.

The areas respectively corresponding to the types of notice information may respectively correspond to groups to which the types of notice information respectively belong.

The notice information may belong to a group among groups based on the type of the notice information, and the type of the notice information may include at least one among an application for processing the notice information, an importance of the notice information, a size of the notice information, a sender of the notice information, descriptions of the notice information, and a data type of the notice information.

The portable device may further include a memory configured to store mapping information in which the areas respectively corresponding to the types of notice information are respectively mapped with groups to which the types of notice information respectively belong, and the controller may be further configured to control the display to activate the pixels included in the area corresponding to the type of the notice information, based on the mapping information.

The notice information may include at least one among call reception information, text message information, e-mail message information, instant message information, social service information, alarm information, timer information, battery information, and schedule information.

The controller may be further configured to control the display to display group notice information of a group to which the notice information belongs, in the area including the activated pixels.

The group notice information may include at least one among a graphic representing the group, a number of notice information belonging to the group, a number of notice information un-read by a user and belonging to the group, a name of the group, an initial of the group, a nickname of the group, an image related with the group, and an animation related with the group.

The portable device may further include a sensor configured to sense a user input of selecting the group notice information, and the controller may be further configured to control the display to display the notice information belonging to the group, in response to the sensor sensing the user input.

The portable device may further include a sensor configured to sense a user input of selecting the group notice information, and the controller may be further configured to control the display to display a list of notice information belonging to the group, in response to the sensor sensing the user input.

According to an aspect of an exemplary embodiment, there is provided a method of providing notice information of a portable device, the method including sensing an event corresponding to the notice information, and activating pixels included in an area corresponding to a type of the notice information, and inactivating pixels included in an area not corresponding to the type of the notice information, among areas that are divided from a display of the portable device to respectively correspond to types of notice information, in response to the sensing the event.

The notice information providing method may further include storing mapping information in which the areas respectively corresponding to the types of notice information are respectively mapped with groups to which the types of notice information respectively belong, and the activating may include activating the pixels included in the area corresponding to the type of the notice information, based on the mapping information.

The notice information providing method may further include displaying group notice information of a group to which the notice information belongs, in the area including the activated pixels.

The notice information providing method may further include sensing a user input of selecting the group notice information, and displaying a list of notice information belonging to the group, in response to the sensing the user input.

According to an aspect of an exemplary embodiment, there is provided a portable device configured to provide notice information, the portable device including a display configured to be divided into areas respectively corresponding to groups of notice information, and a controller configured to obtain the notice information, determine a group to which the obtained notice information belongs among the groups, determine an area corresponding to the determined group among the areas, and control the display to activate pixels included in the determined area, inactivate pixels included in an area not corresponding to the determined group among the areas, and display group notice information of the determined group in the determined area including the activated pixels.

BRIEF DESCRIPTION OF THE DRAWINGS

The above and/or other aspects will be more apparent by describing exemplary embodiments, with reference to the accompanying drawings, in which:

FIG. 4 is a diagram illustrating mapping information according to an exemplary embodiment;

FIGS. 5A, 5B, and 5C are diagrams illustrating group notice information according to an exemplary embodiment;

DETAILED DESCRIPTION OF EXEMPLARY EMBODIMENTS

Figure 1:
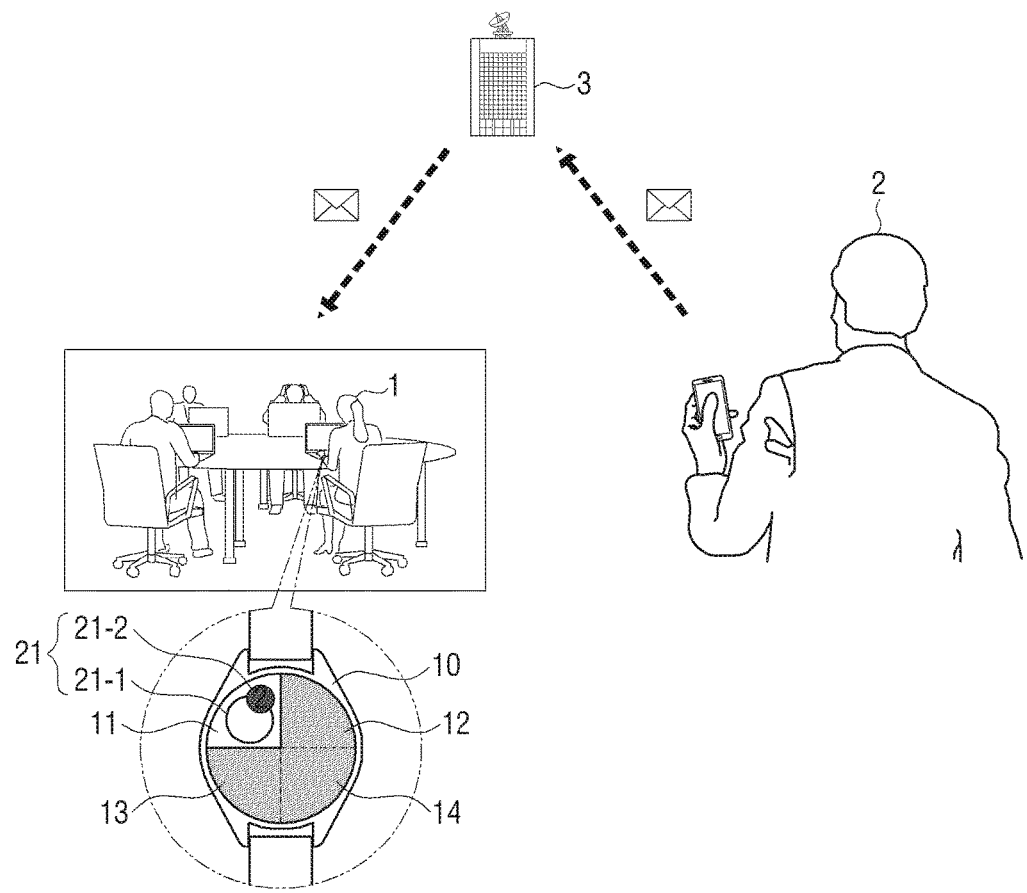
FIG. 1 is a diagram illustrating notice information being provided to a portable device according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

The terms such as "first" or "second" may be used to explain various elements, but the elements are not limited thereto. The terms are used only for the purpose of distinguishing one element from the other.

A singular expression includes a plural expression, unless otherwise specifically defined.

In the following description, when a portion is "connected" to another portion, this includes not only the instance of being "directly connected", but also the instance of being "electrically connected" with the intervention of another device in between.

Further, according to an exemplary embodiment, a user input may include at least one among touch input, bending input, voice input, button input, motion input and multimodal input, but not limited thereto.

Further, according to an exemplary embodiment, the "touch input" may include a touch gesture performed by a user on a display and a cover to control a device. Further, the "touch input" may include touches not in contact with the display, i.e., touches spaced away by more than a distance (e.g., floating or hovering). The touch input may be touch & hold gesture, tap gesture to discontinue after the touch, double tap gesture, panning gesture, flick gesture, touch-drag gesture to move toward one direction after touch, or pinch gesture, but not limited thereto.

Further, according to an exemplary embodiment, the "button input" may refer to an input made by a user to control the device by using a physical button attached on the device.

Further, according to an exemplary embodiment, the "motion input" may refer to a motion performed by a user on the device to control the device. For example, the motion input may include the user rotating the device, tilting the device, or moving the device upward, downward, leftward and rightward.

Further, according to an exemplary embodiment, the "multimodal input" may refer to a combination of two or more manners of inputs. For example, the device may receive a touch input and a motion input together from a user, or receive a touch input and a voice input together from a user.

Further, according to an exemplary embodiment, an "application" may refer to a group of computer programs designed to perform functions. Various application may be provided in the exemplary embodiments of the present disclosure. For example, there may be game application, video play application, map application, memo application, schedule application, phone book application, broadcasting application, exercise support application, payment application, photo folder application, medical device control application, or user interface providing application for a plurality of medical devices, but not limited thereto.

Further, according to an exemplary embodiment, the "application identification information" may refer to unique information to distinguish an application from another application. For example, the application identification information may be icon, index item, or link information, but not limited thereto.

Further, according to an exemplary embodiment, a user interaction (UI) element may refer to an element that can perform interaction with a user, thus providing visual, auditory or olfactory feedbacks in response to a user input.

Further, according to an exemplary embodiment, the "notice information" may include information received at the portable device from an external device, information indicating status of the portable device, or information previously registered by a user.

For example, the information received at the portable device from an external device may be phone reception information, text message information (e.g., SMS and MMS message, etc.), e-mail message information or instant message (e.g., Kakao message, Whatsapp message, etc.). Further, the above-mentioned information may be social service information indicating that twits, comments, contents are registered, deleted, or edited on a social server (e.g., facebook, twitter, or linkedin).

In another example, the information indicating status of the portable device may be battery information of the portable device 10 or communication information of the portable device.

In another example, the information previously registered by a user may be alarm information, timer information or schedule information.

Further, according to an exemplary embodiment, the "notice information" may refer to information inclusive of all of the notice reception information informing the arrival of the notice information, descriptions of the notice information, and identification information of the notice information. For example, when the notice information is message information, the notice information may include at least one among the message reception information informing the arrival of a message, the message identification information (e.g., message sender information or message sending server information) and message descriptions (e.g., message title, message main body, message attachment file title, or message attachment file descriptions).

FIG. 1 is a diagram illustrating notice information being provided to a portable device 10 according to an exemplary embodiment.

Referring to FIG. 1, the portable device 10 may be implemented as devices for various purposes. For example, the portable device 10 according to an exemplary embodiment may include a mobile phone, a smart phone, a laptop computer, a tablet device, an electronic book device, a digital broadcasting device, personal digital assistants (PDA), a portable multimedia player (PMP), a navigation or a wearable device such as smart watch, smart glasses, or head-mounted display (HMD). For the convenient explanation, the operation of the portable device 10 according to an exemplary embodiment may be described based on the smart watch.

Referring to FIG. 1, a user 1 is holding a meeting with third parties. In this situation, a counterpart 2 of the user 1 sends a message to the user 1. The message is transmitted through a station 3 to the user. In this case, the portable device 10 of the user 1 may sense an event informing the arrival of the message. In response to the sensed event, the portable device 10 may determine an area 11 corresponding to a group to which the message belongs among a plurality of areas 11 to 14 on a display 130. Further, the portable device 10 may activate pixels included in the determined area 11, and displays group notice information 21 of the group to which the message belongs on the determined area 11 to display the arrival of the message.

Referring to FIG. 1, the group notice information 21 includes a graphic 21-1 representing the group and a number 21-2 of the notice information belonging to the group (e.g., a number of messages not read by a user). Herein, as illustrated in FIG. 1, the group notice information 21 includes both the graphic 21-1 representing the group and the number 21-2 of the notice information belonging to the group, although this is an exemplary embodiment. Accordingly, the group notice information 21 may include only one among the graphic 21-1 representing the group and the number 21-2 of the notice information belonging to the group. The graphic 21-1 representing the group may have different colors, shapes or images per type of the group, for example. The graphic 21-1 representing the group may be displayed on the area 11 corresponding to the group when there is notice information belonging to the group.

Accordingly, because the group notice information is displayed on the activated pixel area, the user 1 can be provided with messages with minimized exposure of the private information during meeting with the third parties. When the user selects the group notice information, the user may be provided with the notice information.

Figure 2A:
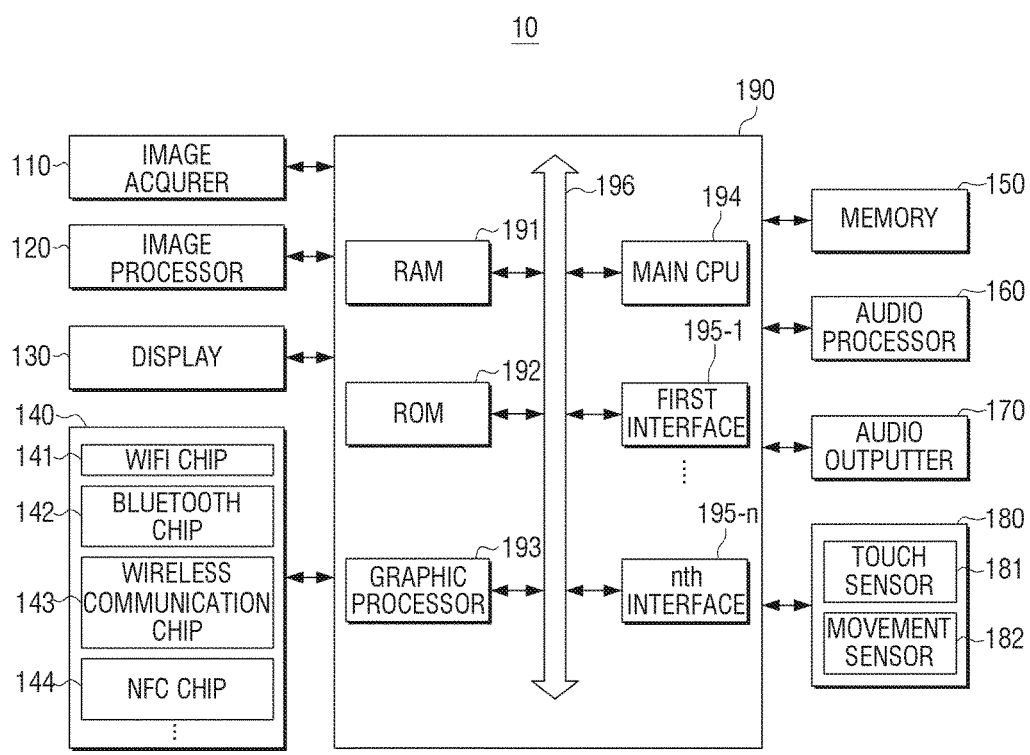
FIG. 2A is a block diagram of a portable device according to an exemplary embodiment.

FIG. 2A is a block diagram of the portable device 10 according to an exemplary embodiment.

Referring to FIG. 2A, the portable device 10 includes an image acquirer 110, an image processor 120, a display 130, a communicator 140, a memory 150, an audio processor 160, an audio outputter 170, a sensor 180, and a controller 190. The constitution of the portable device 10 illustrated in FIG. 2A may be an exemplary embodiment. The portable device 10 may not be limited to an exemplary embodiment in the block diagram mentioned above. Thus, according to the type or the purpose of the portable device 10, omission, modification or addition of a part of the constitution of the portable device 10 in FIG. 2A is possible.

The image acquirer 110 may obtain image data through various sources. For example, the image acquirer 110 may receive image data from an external server and an external device.

Further, the image acquirer 110 may obtain image data by photographing the external environment. For example, the image acquirer 110 may be implemented as a camera photographing the external environment of the portable device 10. In this case, the image acquirer 110 may include a lens through which an image is transmitted and an image sensor which senses the image transmitted through the lens. The image sensor may be implemented as a CCD image sensor or a CMOS image sensor. The image data obtained through the image acquirer 110 may be processed at the image processor 120.

The image processor 120 is configured to process the image data received from the image acquirer 110. The image processor 120 may perform various processing such as decoding, scaling, noise filtering, frame rate converting, or resolution converting of the image data.

The display 130 may display at least one among the video frame which is the image data processed at the image processor 120 or various screens generated at a graphic processor 193 on the display area. The display area of the display 130 may be an area where information can be displayed, and it may be divided into a plurality of areas. According to an exemplary embodiment, the display 130 being divided into a plurality of areas may mean that the display area of the display 130 may be divided into a plurality of areas.

The display 130 may be provided in various sizes. For example, the display 130 may have the size of 3 inches, 4 inches, 4.65 inches, 5 inches, 6.5 inches, or 8.4 inches. The display 130 may be composed of a plurality of pixels. Herein, a horizontal number x a vertical number regarding a plurality of pixels may express the resolution. For example, the display 130 may have 320×320, 360×480, 720×1280, 1280×800, or 3940×2160 resolution.

According to an exemplary embodiment, a number of pixels may be activated among a plurality of pixels of the display 130. For example, regarding OLED (organic light emitting diodes) display or AM-OLED (active-matrix organic light emitting diodes) display, elements of the display may be respectively controlled. Thus, elements corresponding to the pixels may be exclusively activated. A plurality of areas respectively corresponding to a plurality of notice information may include a plurality of pixels, and the pixels included in the area corresponding to the notice information among a plurality of areas may be exclusively activated.

The display 130 may be coupled with at least one among the front face area, the sectioned area and the rear face area of the portable device 10 in the flexible display form. The flexible display may be bent or curved without being damaged due to a substrate which is as thin and flexible as a paper sheet. The flexible display may be produced with the plastic substrate as well as glass substrate. When the plastic substrate is used, the flexible display may be formed with a low temperature producing processor instead of the conventionally-used producing processor to prevent the damage on the substrate. Further, by substituting the glass substrate covering the flexible liquid crystal with the plastic film, the flexibility is obtained, allowing it to be folded and unfolded. In addition to the thinness and the lightness, the flexible display may have strong durability against shock, and curvability and bendability, and ability to be formed into various shapes.

The display 130 may be combined with a touch sensor to be formed into a touch screen in layered structure. The touch screen may have a display function and a function to detect touch input pressure as well as touch input position and touch area size. Further, the touch screen may have not only a real-touch function, but also a function to detect the proximity touch.

The communicator 140 is configured to perform communication with various types of the external devices according to various types of the communication methods. The communicator 140 may include at least one among a WiFi chip 141, a Bluetooth chip 142, a wireless communication chip 143, and a near field communication (NFC) chip 144. Further, the controller 190 may perform communication with an external server or various external devices by using the communicator 140.

The WiFi chip 141 and the Bluetooth chip 142 may perform communication respectively according to WiFi communication method and Bluetooth communication method. When using the WiFi chip 141 or the Bluetooth chip 142, various connecting information such as SSID and session keys may be first transmitted and received so that the communication may be connected by using the received connecting information, and then various pieces of information may be transmitted and received. The wireless communication chip 143 may refer to chip to perform communication according to the various communication standards such as IEEE, Zigbee, 3G (3$^{rd}$ Generation), 3GPP (3$^{rd}$ Generation Partnership Project), and LTE (Long Term Evolution). The NFC chip 144 may refer to chip to operate according to NFC (Near Field Communication) method using 13.56 MHz bandwidths among the various RF-ID frequency bandwidths such as 135 kHz, 13.56 MHz, 433 MHz, 860~960 MHz, and 2.45 GHz.

The memory 150 may store various programs and data requested for the operation of the portable device 10. The memory 150 may be implemented as non-volatile memory, volatile memory, flash memory, hard disc drive (HDD) or solid state drive (SDD). The memory 150 may be accessed by the controller 190, and the controller 190 may perform reading, recording, revising, deleting, and renewing of the data in the memory 150. According to an exemplary embodiment, the term "memory" may include the memory 150, ROM and RAM within the controller 190, or a memory card attached on the portable device 10 (e.g., micro SD card or memory stick).

Further, the memory 150 may store programs and data to generate various screens to be displayed on the display area of the display 130.

Figure 2B:
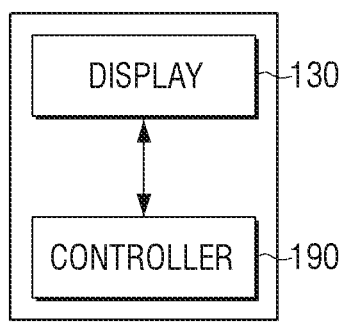
FIG. 2B is a block diagram of a portable device according to another exemplary embodiment.
Figure 2C:
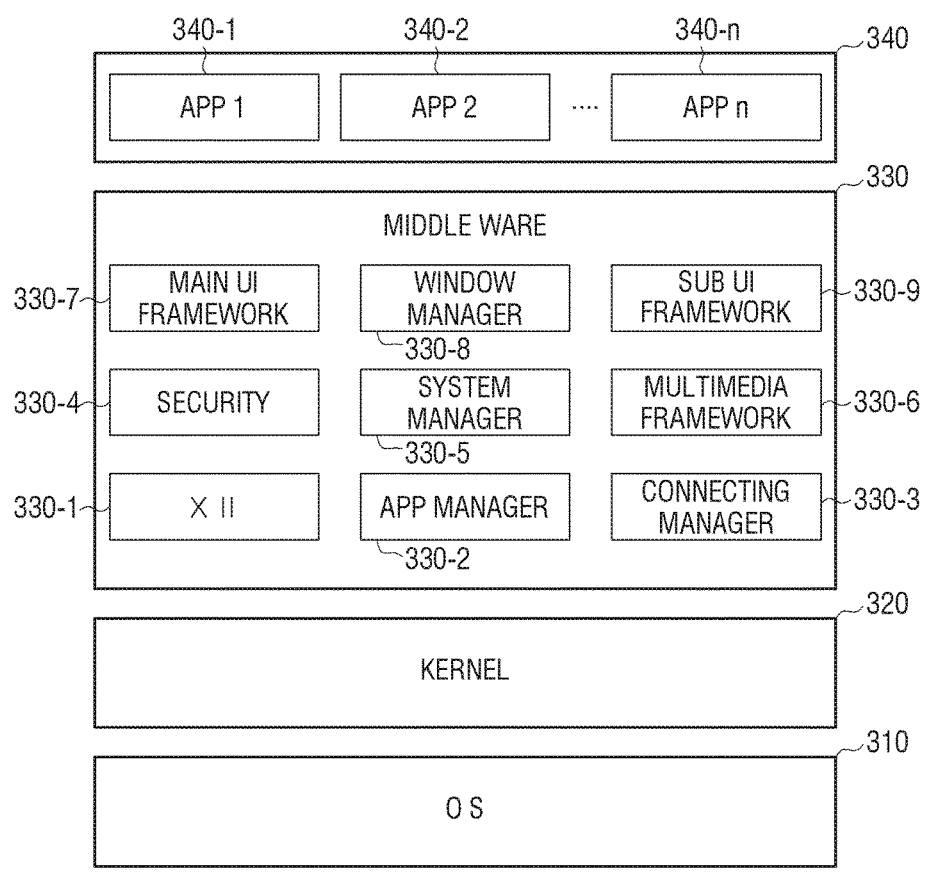
FIG. 2C is a diagram illustrating a structure of software stored in a portable device according to an exemplary embodiment.

FIG. 2C is a diagram illustrating a structure of software stored in the portable device 10 according to an exemplary embodiment. In detail, FIG. 2C illustrates the structure of the software stored in the memory 150. In FIG. 2C, the memory 150 stores the software including an OS 310, a kernel 320, middleware 330, and an application 340.

The OS 310 (Operating System) may perform a function to control and manage operation of the hardware. Thus, OS 310 may be a layer which manages basic functions such as hardware management, memory, or security.

The kernel 320 may serve as a passage to deliver various signals including a touch signal sensed at the sensor 180 to the middleware 330.

The middleware 330 may include various software modules to control the operation of the portable device 10. Referring to FIG. 2C, the middleware 330 includes a X11 module 330-1, a APP manager 330-2, a connecting manager 330-3, a security module 330-4, a system manager 330-5, a multimedia framework 330-6, a main UI framework 330-7, a window manager 330-8, and a sub UI framework 330-9.

The X11 module 330-1 is configured to receive various event signals from various hardware provided on the portable device 10. Herein, the event may be variously set, such as, event of sensing user gestures, event of generating system alarms, and event of performing or completing a program.

The APP manager 330-2 is configured to manage status of executing various applications 340 installed on the memory 150. APP manager 330-2 may call and implement the application corresponding to the event when the event of implementing an application is sensed by the X11 module 330-1.

The connecting manager 330-3 is configured to support the wire or wireless network connection. The connecting manager 330-3 may include various sub modules such as DNET module and UPnP module.

The security module 330-4 is configured to support certification regarding the hardware, the request permission, or the secure storage.

The system manager 330-5 may monitor status of each element within the portable device 10, and provide the monitoring results to the other modules. For example, when the battery is short, the error occurs, or the communication is disconnected, the system manager 330-5 may provide the monitoring results to the main UI framework 330-7 or the sub UI framework 330-9, and output a notice message or a notice sound.

The multimedia framework 330-6 is configured to reproduce the multimedia contents stored in the portable device 10 or provided from external sources. The multimedia framework 330-6 may include a player module, a camcorder module and a sound processing module. Accordingly, the multimedia framework 330-6 may perform a function to reproduce various multimedia contents, create and reproduce images and sounds.

The main UI framework 330-7 is configured to provide various UIs to be displayed on the main area of the display 130. The sub UI framework 330-9 is configured to provide various UIs to be displayed on the sub areas. The main UI framework 330-7 and the sub UI framework 330-9 may include an image compositor module to construct various UI elements, a coordinate compositor module to calculate coordinates where UI elements are displayed, a rendering module to render the constructed UI elements on the calculated coordinates, and a 2D/3D UI toolkit to provide tools to construct UI in 2D or 3D form.

The window manager 330-8 may sense a touch event by a user body or a pen, or sense other input events. The window manager 330-8 may deliver the event signal to the main UI framework 330-7 or the sub UI framework 330-9 when such an event is sensed so that corresponding operation to the event is performed.

The portable device 10 may store various program modules such as a writing module to draw a line according to the dragging tracks and an angle calculating module to calculate pitch angle, roll angle, and yaw angle based on the sensed values in a movement sensor 182 when a user touches and drags on the screen.

The application module 340 may include applications 340-1 to **340-*n* to support various functions. For example, the application module 340 may include program modules to provide various services such as navigation program module, game module, electronic book module, calendar module, or alarm management module. The applications may be installed by default, or installed and used arbitrarily by a user. When UI element is selected, a main CPU 194 of FIG. 2A may implement the application corresponding to the selected UI element by using the application module 340**.

The software structure illustrated in FIG. 2C is an exemplary embodiment, and exemplary embodiments are not limited thereto. Thus, some modules may be deleted, modified or added according to the type or the purpose of the portable device 10. For example, the memory 150 may additionally include other various program modules such as a sensing module to analyze the signals sensed at the various sensors, a messaging module like a messenger program, a text message program, and an e-mail program, a call info aggregator program module, a VoIP module, and a web browser module.

Referring to FIG. 2A again, the audio processor 160 is configured to perform processing regarding the audio data of the video contents. The audio processor 160 may perform various processing such as decoding, amplifying, and noise filtering regarding the audio data. The audio data processed at the audio processor 160 may be outputted to the audio outputter 170.

The audio outputter 170 is configured to output various alarm sounds or voice messages as well as audio data in which various processing is performed by the audio processor 160 such as decoding, amplifying or noise filtering. The audio outputter 170 may be implemented as a speaker, although it may be an exemplary embodiment. The audio outputter 170 may be implemented as outputting component that can output the audio data.

The sensor 180 may sense various user interactions. The sensor 180 may detect at least one among various changes of the portable device 100 such as position changes, illumination changes, and acceleration changes, and deliver corresponding electrical signals to the controller 190. Thus, the sensor 180 may sense status changes performed based on the portable device 10, generate corresponding sensing signals, and deliver a sensed result to the controller 190. According to an exemplary embodiment, the sensor 180 may be implemented as various sensors, and the electrical power may be provided to at least one sensor which is set according to the controlling of the sensor 180 when the portable device 10 operates (or when a user establishes), which can sense the status changes of the portable device 10.

The sensor 180 may include various sensors, and be constructed by including at least one device among all forms of sensing devices that can detect the status changes of the portable device 10. For example, the sensor 180 may be constructed by including at least one sensor among various sensing devices such as a touch sensor, an acceleration sensor, a gyro sensor, an illuminance sensor, a proximity sensor, a pressure sensor, a noise sensor (e.g., microphone), a video sensor (e.g., camera module), a pen recognizing sensor, and a timer.

In FIG. 2A, the sensor 180 includes a touch sensor 181 and a movement sensor 182 according to the sensing purposes, but is not limited thereto. Accordingly, the sensor 180 may be further distinguished depending on various other purposes. The distinguishing may not indicate the physical dividing. At least one or more sensors may be combined with each other, to thus perform the functions of the above-mentioned sensors 181, 182. Further, depending on the method as implemented, the constitution or the functions of the sensor 180 may be partially included in the controller 190.

The touch sensor 181 may sense a user finger input, and output a touch event value corresponding to the sensed touch signal. The touch panel of the touch sensor 181 may be installed under the display 130. The methods in which the touch sensor 181 senses the user finger input may be capacitive method and resistive method. The capacitive method is a method to calculate a touch coordinate by sensing the micro electricity excited by the user body. The resistive method is a method to calculate a touch coordinate by including two electrode substrates included in the touch panel and by sensing the electrical current flows when the upper and the lower substrates contact each other on the touched point.

The touch sensor 181 may obtain the output signal according to the user input on the touch sensor. The touch sensor 181 may calculate user input information such as a touch position or a touch coordinate, a touch number, a touch intensity, a cell ID, a touch angle or a touch size from the signal values, and determine the type of the touch input by using the calculated user input information. Herein, the touch sensor 181 may determine the type of the touch input by using the touch recognizing algorithms and the touch pattern data on the memory 150 of the touch panel. When the type of the touch input is determined, the touch sensor 181 may transmit the information regarding the type of the touch input to the controller 190. The touch sensor 181 may sense the approaching touch position (or hovering position) inputted by a user, as described above.

The controller 190 may perform part of the functions regarding the touch sensor 181. For example, the touch sensor 181 may transmit the signal value obtained from the touch sensor or the user input information calculated from the signal value to the controller 190. The controller 190 may determine the type of the touch input by using the received signal value or the user input information with the touch recognizing algorithms and the touch pattern data stored on the memory 150. Further, when the call application is executed, the controller 190 may detect that the call button of the call application is selected from the user input information or the type of the touch input, and transmit the signal through the communicator 140 to the contact person.

The movement sensor 182 may sense the movement of the portable device 10 (e.g., rotating or tilting) by using at least one among the acceleration sensor, the tilt sensor, the gyro sensor, and the 3-axis magnetic sensor. Further, the movement sensor 182 may deliver the generated electrical signal to the controller 190. For example, the movement sensor 182 may measure the acceleration in which the movement acceleration of the portable device 10 is added with the gravity acceleration. However, the movement sensor 182 may measure only the gravity acceleration unless the portable device 10 moves.

For example, it is assumed herein that the movement sensor 182 uses the acceleration sensor. The gravity acceleration may be measured respectively regarding X, Y, and Z axes based on the portable device 10. Herein, when the front face of portable device 10 is directed upward, the direction is assumed to be positive (+) direction of the gravity acceleration. When the rear face of the portable device 10 is directed upward, the direction is assumed to be negative (−) direction of the gravity acceleration. When the rear face of the portable device 10 contacts and lain on the horizontal plane, the gravity acceleration measured by the movement sensor 182 may be 0 m/sec$^2$ on X and Y axes and a positive value on Z axis (e.g., +9.8 m/sec$^2$). On the contrary, when the front face of the portable device 10 contacts and lain on the horizontal plane, the gravity acceleration measured by the movement sensor 182 may be 0 m/sec$^2$ on X and Y axes, and a negative value on Z axis (e.g., −9.8 m/sec$^2$). Further, when the portable device 10 is assumed to be lain with a tilt on the surface of the table, the gravity acceleration measured by the movement sensor 182 may be values other than 0 m/sec$^2$ on at least one axis. Herein, a square-root of the value calculated by adding the multiple values of the three elements on the three axes, i.e., the size of the vector sum may be the value mentioned above (e.g., 9.8 m/sec$^2$). In this case, the movement sensor 182 may sense the acceleration values respectively regarding X, Y, and Z axes on the coordinate system. The axes and corresponding gravity accelerations can be modified according to the attached position of the sensor.

The sensor 180 may further include a pen sensor (e.g., pen recognizing panel). The pen sensor may sense a user pen input made as the user touch pen (e.g., stylus pen or digitizer pen) is operated, and output a pen approaching event value or a pen touch event value. The pen sensor may be implemented with an EMR method, and may sense the touch input or the approach input according to the intensity changes of the electromagnetic fields with the pen approach or the pen touch. The pen recognizing panel may be constructed by including an electrical induction coil sensor having a grid structure and an electrical signal processor consecutively providing the AC signals of a frequency to each loop coil of the electrical induction coil sensor. When the pen including the resonance circuits is provided adjacent to the loop coil in the pen recognizing panel, the magnetic field transmitted from the corresponding loop coil generates the electrical currents based on the electrical induction on the resonance circuits within the pen. Based on the electrical currents, the induced magnetic field is generated from the coils of the resonance circuits within the pen, and the pen recognizing panel may detect the induced magnetic field from the loop coil in the signal receiving state. Thus, the pen approach position or the touch position may be sensed.

The microphone may receive a user voice to control a medical device (e.g., photography start, photography stop, or photography end) through the portable device 10, and may recognize the user voice through the voice recognizing module. Further, the recognized result may be transmitted to the controller 190. Herein, the voice recognizing module may be positioned somewhere other than the microphone, such as, on a part of the controller 190 or outside the portable device 10.

The controller 190 (or processor) may control overall operation of the portable device 10 by using the various programs stored on the memory 150.

The controller 190 includes RAM 191, ROM 192, a graphic processor 193, the main CPU 194, first to nth interfaces 195-1 to 195-n, and a bus 196. Herein, the RAM 191, the ROM 192, the graphic processor 193, the main CPU 194, and the first to the nth interfaces 195-1 to 195-n may be connected to each other through the bus 196.

The RAM 191 may store O/S and application programs. When the portable device 10 boots, O/S may be stored on the RAM 191, and the various application data selected by a user may be stored on the RAM 191.

The ROM 192 may store command sets for the system booting. When a turn-on command is inputted and the electrical power is provided, the main CPU 194 may copy the stored O/S on the memory 150 to the RAM 191 according to the commands stored on the ROM 192, and boot the system by implementing O/S. When booting completes, the main CPU 194 may copy the various application programs stored on the memory 150 to the RAM 191, and perform various operations by implementing the copied application programs in the RAM 191.

The graphic processor 193 may generate a screen including various objects such as items, images and texts by using a calculator and a renderer. Herein, the calculator may be configured to calculate feature values such as coordinate values, shapes, sizes and colors in which each object will be displayed according to layouts of the screen by using the controlling commands received from the sensor 180. Further, the renderer may be configured to generate the screen in the various layouts including objects based on the feature values calculated at the calculator. The screen generated by the renderer may be displayed within the display area of the display 130.

The main CPU 194 may access the memory 150, and perform booting by using the stored O/S on the memory 150. Further, the main CPU 194 may perform various operations by using the stored various programs, contents, and data on the memory 150.

The first to the nth interfaces 195-1 to 195-n may be connected with the various constituent elements mentioned above. One of the first to the nth interfaces 195-1 to 195-n may be a network interface connected with the external device through the network.

FIG. 2B is a block diagram of the portable device 10 according to another exemplary embodiment.

Referring to FIG. 2B, the portable device 10 includes the display 130 and the controller 190.

The display 130 may be divided into a plurality of areas respectively corresponding to a plurality of notice information. A plurality of notice information may respectively belong to a plurality of groups.

Figure 3A:
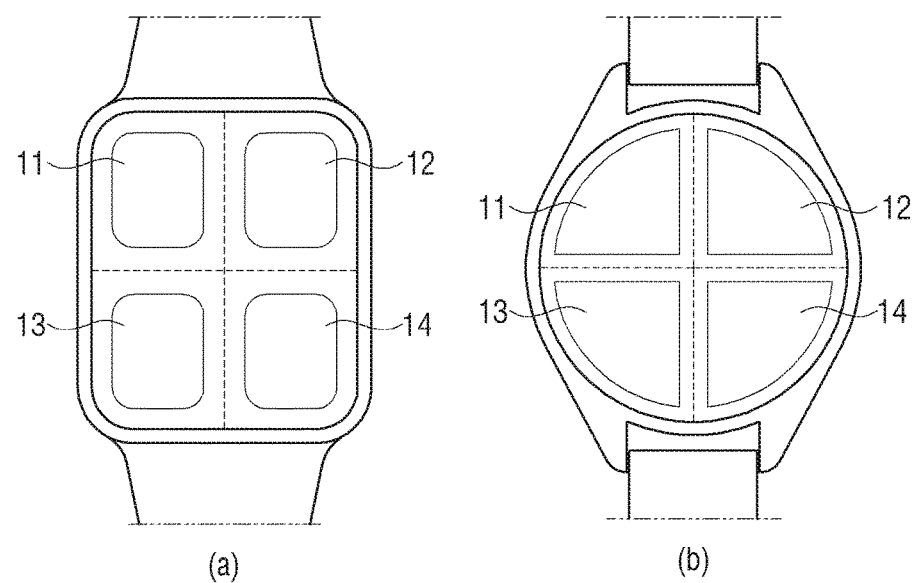
FIGS. 3A and 3B are diagrams illustrating a display being divided into a plurality of areas respectively corresponding to a plurality of groups according to an exemplary embodiment.
Figure 3B:
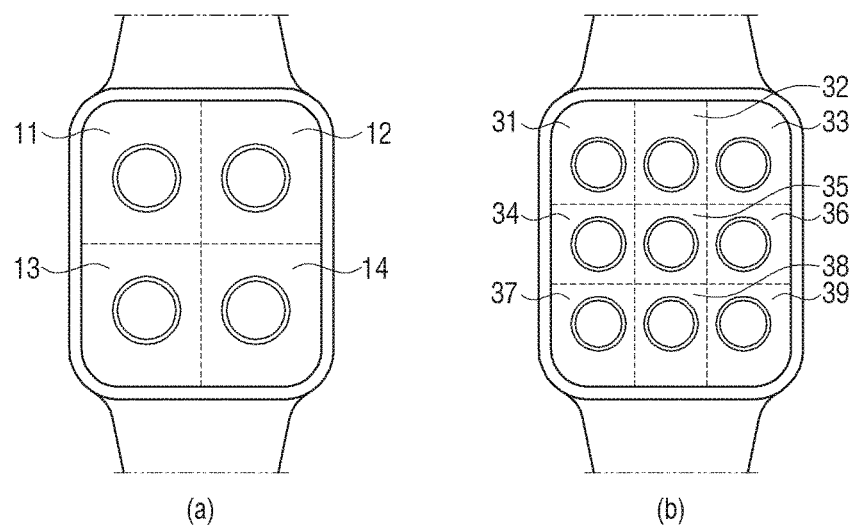

FIGS. 3A and 3B are diagrams illustrating that the display 130 is divided into a plurality of areas respectively corresponding to a plurality of groups according to an exemplary embodiment. For example, a plurality of groups may be a basic group, a call/schedule group, an SNS (social network service) group, and a message group. The examples regarding the notice information belonging to a plurality of groups will be described below by referring to FIG. 4.

Referring to FIG. 3A, view (a) illustrates the display 130 in the square shape, and view (b) illustrates the display 130 in the circle shape. However, this is an exemplary embodiment. The display 130 that can be applied to an exemplary embodiment may have various shapes.

Referring to FIG. 3A, a plurality of groups may respectively correspond to a upper left area 11, a upper right area 12, a lower left area 13, and a lower right area 14 of the display 130, although this is an exemplary embodiment. Accordingly, a plurality of areas respectively corresponding to a plurality of groups may correspond to the various positions of the display 130.

Referring to view (a) of FIG. 3B, a plurality of groups may respectively correspond to a plurality of areas that are divided to 2×2. A plurality of groups may respectively correspond to the upper left area 11, the upper right area 12, the lower left area 13, and the lower right area 14 of the display 130. Further, referring to view (b) of FIG. 3B, a plurality of groups may respectively correspond to a plurality of areas that are divided to 3×3. A plurality of groups may respectively correspond to a plurality of divided areas 31 to 39 on the display 130. A plurality of areas may be divided into various arrangements such as 1×2, 2×1, 3×4, 4×3, 4×4. Further, a plurality of areas may have various shapes such as square, circle, fan, and polygon, but are not limited thereto.

When the event related with the notice information is sensed, the controller 190 may control the display 130 to activate pixels included in the area corresponding to the notice information among a plurality of areas. Thus, the controller 190 may control the display 130 to activate the pixels included in the area corresponding to a group to which the notice information related with the sensed event belong, among the areas corresponding to a plurality of groups. Further, the controller 190 may control the display 130 to inactivate pixels included in the areas corresponding to groups to which the notice information do not belong, among the areas corresponding to a plurality of groups. Herein, the event may refer to command signal or interrupt signal to cause the portable device 10 to operate in a function. For example, when a message is received from the external device, the controller 190 may sense the external interrupt signal related with the arrival of the message.

The portable device 10 may further include the memory 150 to include mapping information in which a plurality of areas are mapped with a plurality of groups to which the notice information belong.

FIG. 4 is a diagram illustrating mapping information according to an exemplary embodiment.

Referring to FIG. 4, a plurality of groups to which the notice information included in the mapping information belong, may include a basic group, a call/schedule group, a SNS (social network service) group, and a message group.

The notice information may belong to one group among a plurality of groups according to the types of the notice information. The types of the notice information may be determined based on at least one among an application processing the notice information, the importance of the notice information, the size of the notice information, the sender of the notice information, the descriptions of the notice information, and the data type of the notice information. Further, the types of the notice information may be determined based on other various standards.

For example, the notice information included in the basic group may include at least one among the alarm information, the timer information, the battery information of the portable device 10, and the communication information of the portable device 10.

The notice information included in the call/schedule group may include at least one among the call reception information and the schedule information previously registered by a user.

The notice information included in the message group may include at least one among the text message information, the e-mail message information and the instant message information.

Although FIG. 4 shows that the notice information belong to any of the basic group, the call/schedule group, SNS group, and the message group, although not limited thereto. The notice information may be divided into various groups. For example, the notice information may be divided into an ad group, a normal importance group, and an importance group. Further, the notice information may be divided into the application group having a high use frequency, the application group having a middle use frequency, and the application group having a low use frequency. Further, the notice information may be divided into a text group, an image group, a video group, and a document group.

Referring to FIG. 4, the pixel area may refer to an area where pixels are activated respectively regarding a plurality of groups, and where the group notice information are displayed respectively regarding a plurality of groups.

For example, when the resolution of the display 130 is 240×320, the group notice information of the basic group is displayed on the pixel area (0, 0)-(119, 159). Further, the group notice information of the call/schedule group is displayed on the pixel area (120, 0)-(239, 159). Further, the group notice information of SNS group is displayed on the pixel area (0, 160)-(119, 319). Further, the group notice information of the message group is displayed on the pixel area (120, 160)-(239, 319).

In FIG. 4, the "notification type" of the group notice information may refer to a form in which the group notice information is displayed. For example, the "static type" may refer to the group notice information displayed as static images, texts or graphics (e.g., geometric figures). In another example, the "dynamic type" may refer to the group notice information displayed as dynamic images, texts or graphics (e.g., geometric figures). The "dynamic type" may include a blinking type or an animation type. The "blinking type" may refer to the group notice information displayed in a blinking manner according a period or rule. Further, the "animation type" may refer to the group notice information changing position or moving as it is displayed. In FIG. 4, the group notice information included in the basic group may be displayed as the static type, the notice information included in the call/schedule and SNS groups may be displayed as the blinking type, and the notice group information included in the message group may be displayed as the animation type.

Further, the notification color of the group notice information may refer to the color of the displayed group notice information in FIG. 4. The group notice information included in the basic group and the call/schedule group are displayed in white, the group notice information included in SNS group is displayed in blue, and the notice group information included in the message group is displayed in red.

The mapping information may further include count information indicating whether or not to display a number of the notice information belonging to the group respectively regarding a plurality of groups. For example, when the mapping information is set to display the count information of the message group, the controller 190 may control the display 130 to display a number of the notice information belonging to the message group on the area corresponding to the message group.

The above described mapping information may be previously set by a provider of the applications installed on the portable device 10 or a provider of the management system. Further, the mapping information may be designated by a user through the user interface.

When activating the pixels included in the area corresponding to the group to which the notice information belong, the controller 190 may control the display 130 to display the group notice information of the group to which the notice information belong, on the activated area.

FIGS. 5A, 5B, and 5C are diagrams illustrating group notice information according to an exemplary embodiment.

Referring to FIG. 5A, the group notice information 21-24 may be displayed on one area among a plurality of areas 11-14 of the display 130. The group notice information 21-24 may include at least one among a graphic of one color displayed on one area of the display 130 and a number of the notice information belonging to the group. In this case, among a plurality of areas, the upper left area 11 may correspond to the private group, the upper right area 12 may correspond to the public group, the lower left area 13 may correspond to the call/message group, and the lower right area 14 may correspond to the schedule group.

When the event related with the notice information belonging to the private group is sensed, the controller 190 controls the display 130 to display a first color graphic 21-1 and a number 21-2 of the notice information belonging to the private group as the group notice information 21 of the private group on the upper left area 11 of the display 130, as illustrated in view (a) of FIG. 5A. Herein, the notice information belonging to the private group may be alarm information set by a user for the private living.

Further, when the event related with the notice information belonging to the public group is sensed, the controller 190 controls the display 130 to display a second color graphic 22-1 and a number 22-2 of the notice information belonging to the public group as the group notice information 22 of the public group on the upper right area 12 of the display 130, as illustrated in view (b) of FIG. 5A. Herein, the notice information belonging to the public group may be news information, ad information or weather information that can be opened to a third party.

Further, when the event related with the notice information belonging to the call/message group is sensed, the controller 190 controls the display 130 to display a third color graphic 23-1 and a number 23-2 of the notice information as group notice information 23 of the call/message group on the lower left area 13 of the display 130, as illustrated in view (c) of FIG. 5A.

Further, when the event related with the notice information belonging to the schedule group is sensed, the controller 190 controls the display 130 to display a fourth color graphic 24-1 and a number 24-2 of the notice information as group notice information 24 of the schedule group on the lower right area 14 of the display 130, as illustrated in view (d) of FIG. 5A.

Referring to FIG. 5B, the group notice information 21-24 are texts representing the group notice information 21-24 displayed on the display area of the display 130. Herein, pixels 21-24 corresponding to the texts on the display area may be activated, and pixels not corresponding to the texts may be inactivated.

When the event related with the notice information belonging to the private group is sensed, the controller 190 controls the display 130 to activate the pixels 21-11, 21-12 corresponding to the text 21 as the group notice information 21 of the private group on the display area of the display 130, as illustrated in view (a) of FIG. 5B.

Further, when the event related with the notice information belonging to the public group is sensed, the controller 190 controls the display 130 to activate the pixels 22-11, 22-12 corresponding to the text 22 as the group notice information 22 of the public group on the display area of the display 130, as illustrated in view (b) of FIG. 5B.

Further, when the event related with the notice information belonging to the call/message group is sensed, the controller 190 controls the display 130 to activate the pixels 23-11, 23-12 corresponding to the text 23 as the group notice information 23 of the call/message group on the display area of the display 130, as illustrated in view (c) of FIG. 5B.

Further, when the event related with the notice information belonging to the schedule group is sensed, the controller 190 controls the display 130 to activate the pixels 24-11, 24-12 corresponding to the text 24 as the group notice information 24 of the schedule group on the display area of the display 130, as illustrated in view (d) of FIG. 5B.

Referring to FIG. 5C, the group notice information 21-24 are images representing the group notice information 21-24 displayed on the display area of the display 130. Herein, the pixels 21-24 corresponding to the images on the display area may be activated, and the pixels not corresponding to the images may be inactivated.

When the event related with the notice information belonging to the private group is sensed, the controller 190 controls the display 130 to activate the pixels 21 corresponding to the image 21 as the group notice information 21 of the private group on the display area of the display 130, as illustrated in view (a) of FIG. 5C.

Further, when the event related with the notice information belonging to the public group is sensed, the controller 190 controls the display 130 to activate the pixels 22 corresponding to the image 22 as the group notice information 22 of the public group on the display area of the display 130, as illustrated in view (b) of FIG. 5C.

Further, when the event related with the notice information belonging to the call/message group is sensed, the controller 190 controls the display 130 to activate the pixels 23 corresponding to the image 23 as the group notice information 23 of the call/message group on the display area of the display 130, as illustrated in view (c) of FIG. 5C.

Further, when the event related with the notice information belonging to the schedule group is sensed, the controller 190 controls the display 130 to activate the pixels 24 corresponding to the image 24 as the group notice information 24 of the schedule group on the display area of the display 130, as illustrated in view (d) of FIG. 5C.

Another example of the group notice information may be a group name, a group initial, a group nickname, or a group related animation. These group notice information may be previously set by a provider of the applications installed on the portable device 10 or a provider of the management system. Further, they may be set by a user through the user interface.

FIGS. 6, 7, 8, 9, 10A, and 10B are diagrams illustrating a screen of a user interface configured to display notice information according to an exemplary embodiment.

Figure 6:
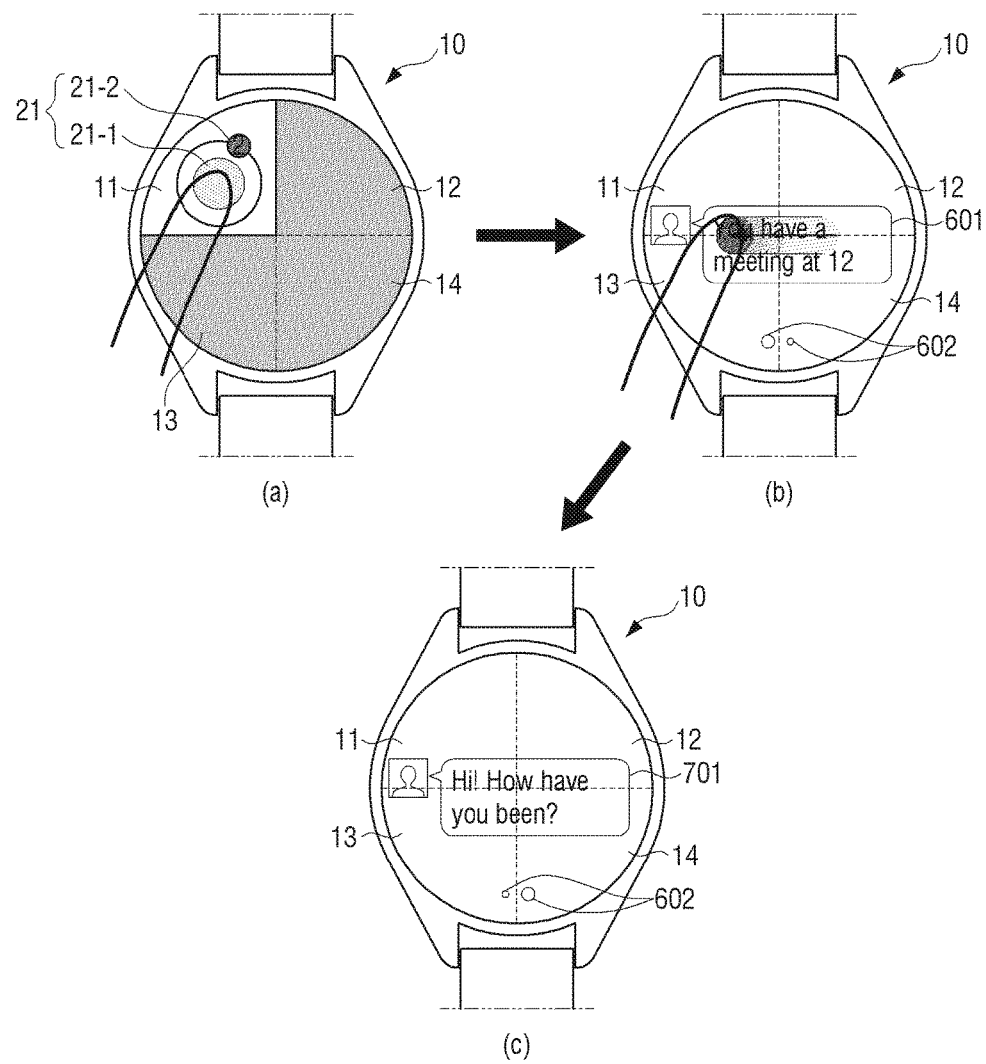
FIGS. 6, 7, 8, 9, 10A, and 10B are diagrams illustrating a screen of a user interface configured to display notice information according to an exemplary embodiment.

Referring to FIG. 6, the display 130 is divided into a plurality of areas 11-14 respectively corresponding to a plurality of notice information. Thus, the display 130 is divided into a plurality of areas 11-14 corresponding to a plurality of groups to which a plurality of notice information belong.

Referring to view (a) of FIG. 6, when the event (e.g., receiving a text message) related with the notice information (e.g., text message information) is sensed, the controller 190 controls the display 130 to activate the pixels included in the area 11 corresponding to the notice information. Further, the controller 190 controls the display 130 to inactivate the pixels included in the areas 12-14 not corresponding to the notice information. Thus, the controller 190 controls the display 130 to activate the pixels included in the area 11 corresponding to the group to which the notice information belong, and inactivate the pixels included in the areas 12-14 corresponding to the groups to which the notice information do not belong.

Further, the controller 190 controls the display 130 to display the group notice information 21 of the group to which the notice information belong, on the activated pixel area. For example, the group notice information 21 is the graphic 21-1 representing the group or the number 21-2 of the notice information not read by a user and belonging to the group.

The sensor 180 may sense a user input of selecting the group notice information 21.

When a user input is sensed, the controller 190 controls the display 130 to display first notice information 601 among the notice information, as illustrated in view (b) of FIG. 6. For example, the controller 190 may control the display 130 to display the descriptions of the text message received from a first other user. Herein, the controller 190 controls the display 130 to display an indicator 602 indicating a number of the notice information. Next, the sensor 180 may sense a user input of touching and dragging toward a first direction (e.g., left or right direction) on the display 130.

When a user input is sensed, the controller 190 controls the display 130 to display second notice information 701 among the notice information, as illustrated in view (c) of FIG. 6. For example, the controller 190 may control the display 130 to display the descriptions of the text message received from a second another user.

Figure 7:
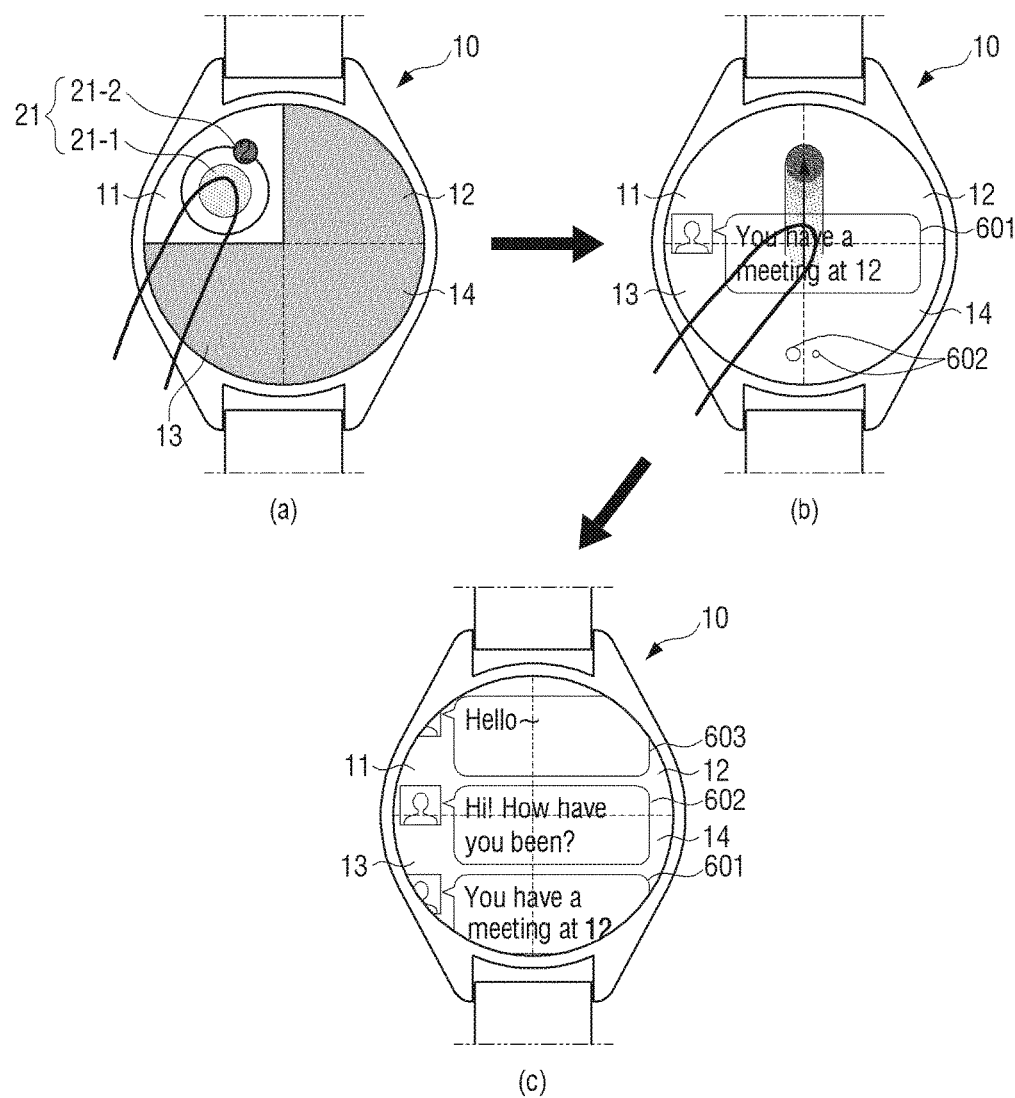

Because views (a) and (b) of FIG. 7 correspond to the views (a) and (b) of FIG. 6, the relevant explanation is not provided herein.

Referring to the view (b) of FIG. 7, the sensor 180 may sense a user input of touching and dragging toward a second direction (e.g., upper or lower direction) on the display 130 while the detailed descriptions of the first notice information 601 are displayed.

When a user input is sensed, the controller 190 controls the display 130 to display other first notice information 602, 603 received from the first other user, as illustrated in (c) of FIG. 7. For example, the controller 190 may control the display 130 to display the descriptions of the text messages previously transmitted and received with the first other user.

The controller 190 may control the display 130 to display the part of the notice information (e.g., part of the descriptions in a text message) when the group notice information is selected according to another exemplary embodiment. In this case, when a user input of touching and dragging on the display 130 is sensed, the controller 190 may control the display 130 to display another part of the notice information (e.g., another part of the descriptions in a text message).

Figure 8:
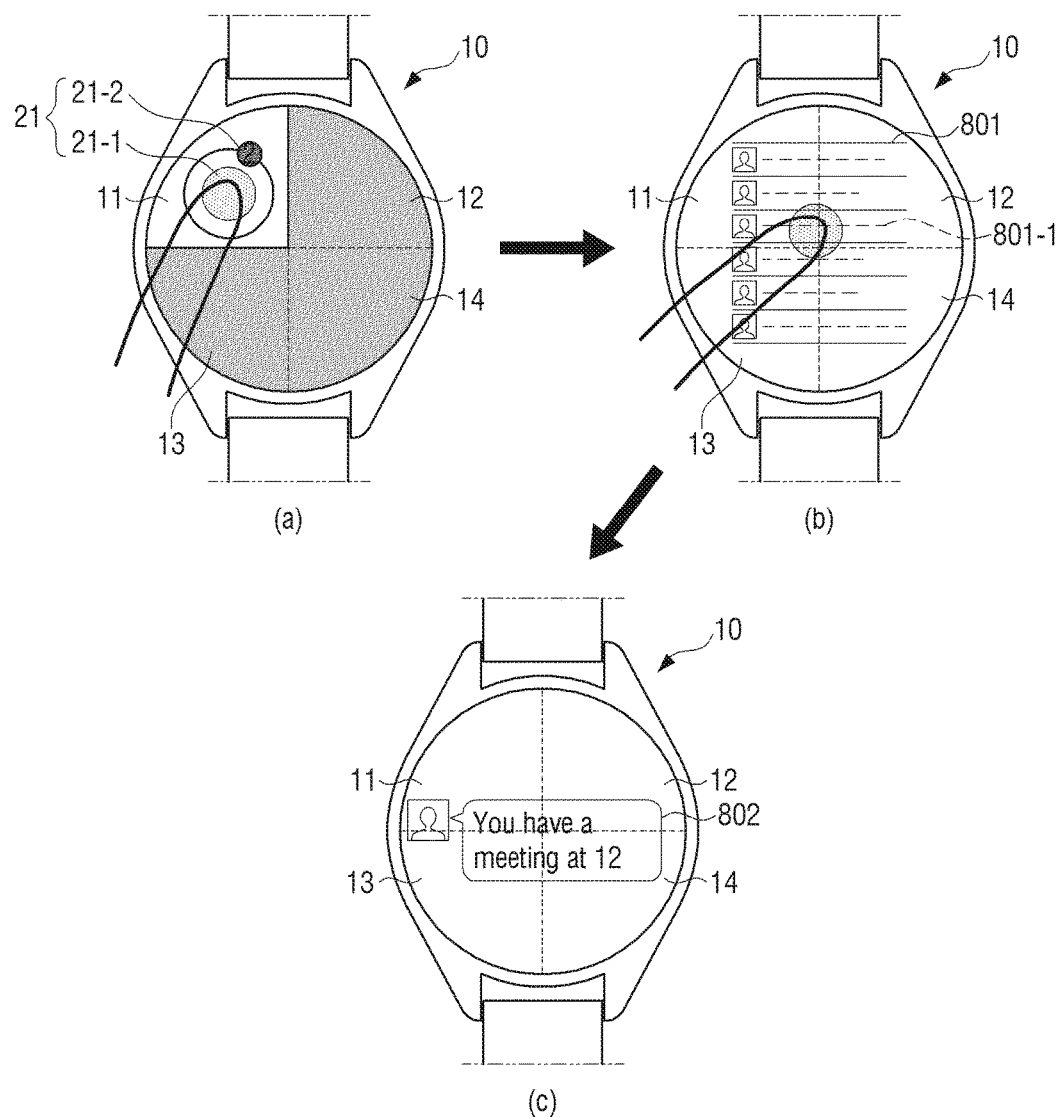

Because view (a) of FIG. 8 corresponds to the view (a) of FIG. 6, the relevant explanation is not provided herein.

The sensor 180 may sense a user input of selecting the group notice information 21 while the group notice information 21 is displayed, as illustrated in the view (a) of FIG. 8. In this case, the controller 190 controls the display 130 to display a group notice list 801, as illustrated in view (b) of FIG. 8. Next, the sensor 180 may sense a user input of selecting identification information 801-1 of the notice information on the group notice list 801.

When a user input is sensed, the controller 190 controls the display 130 to display selected notice information 802, as illustrated in view (c) of FIG. 8.

Figure 9:
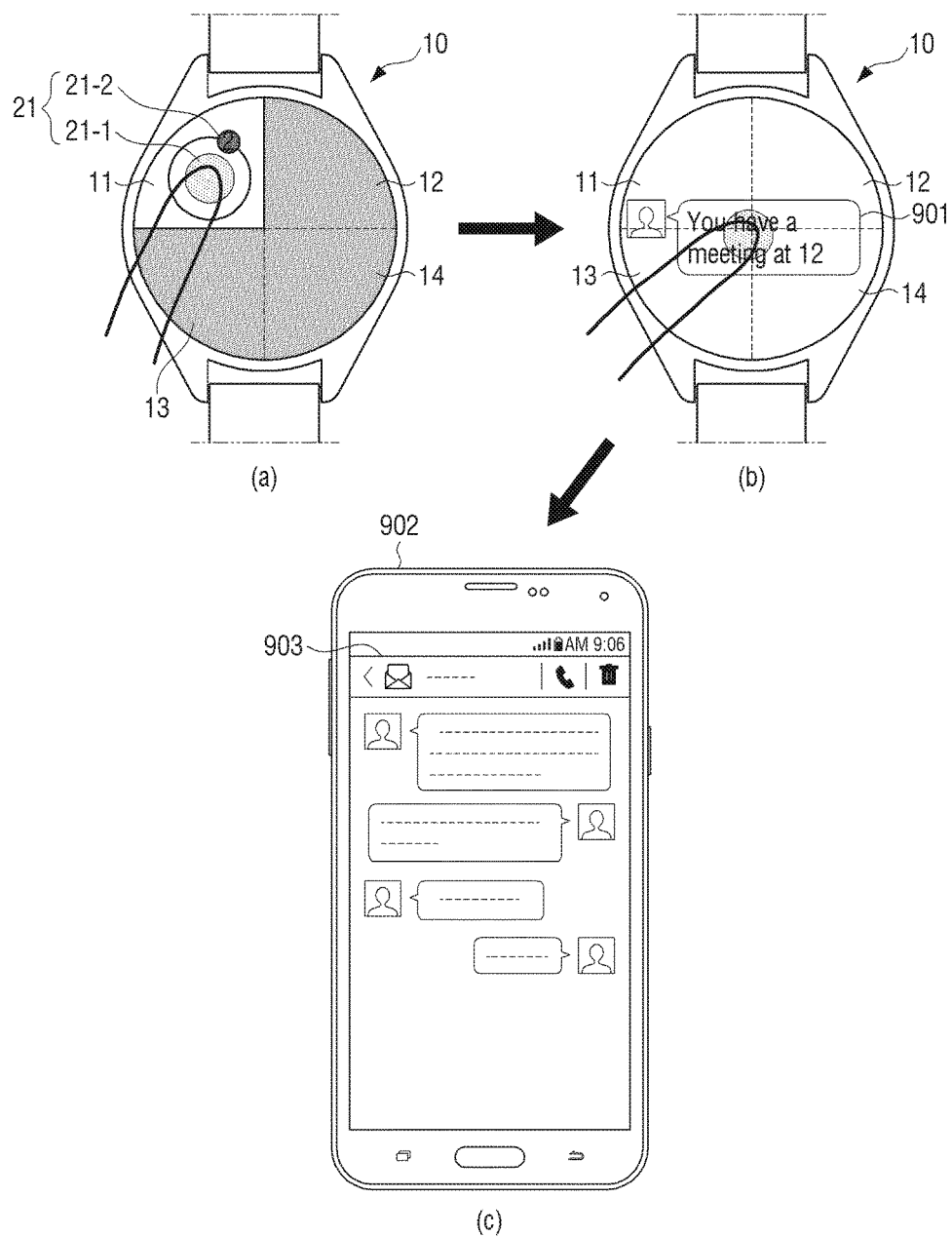

Because views (a) and (b) of FIG. 9 correspond to the views (a) and (b) of FIG. 6, the relevant explanation is not provided herein.

Referring to the view (b) of FIG. 9, the sensor 180 may sense a user input of selecting first notice information 901 on the display 130 while the first notice information 901 is displayed. In this case, the controller 190 controls the external device 902 to display an implementing screen 903 of the application related with the first notice information (e.g., text message application) on an external device 902, as illustrated in view (c) of FIG. 9. Herein, the application implementing screen 903 may display the notice information transmitted and received with the first another user as well as first notice information.

Figure 10A:
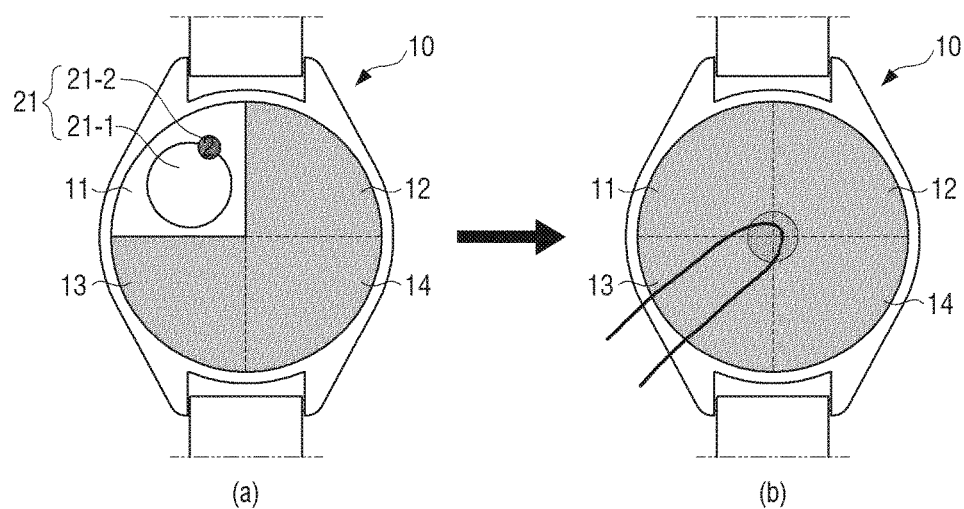

Because view (a) of FIG. 10A corresponds to the view (a) of FIG. 6, the relevant explanation is not provided herein.

A user input may not be sensed for a time (e.g., two seconds) while the group notice information is displayed in the view (a) of FIG. 10A. In this case, the controller 190 controls the display 130 to be inactivated, as illustrated in view (b) of FIG. 10A. Herein, the inactivated display 130 may include the black screen state of the display 130, the off state of the display panel in the display 130, or the state that may not display any information on the display 130.

Figure 10B:
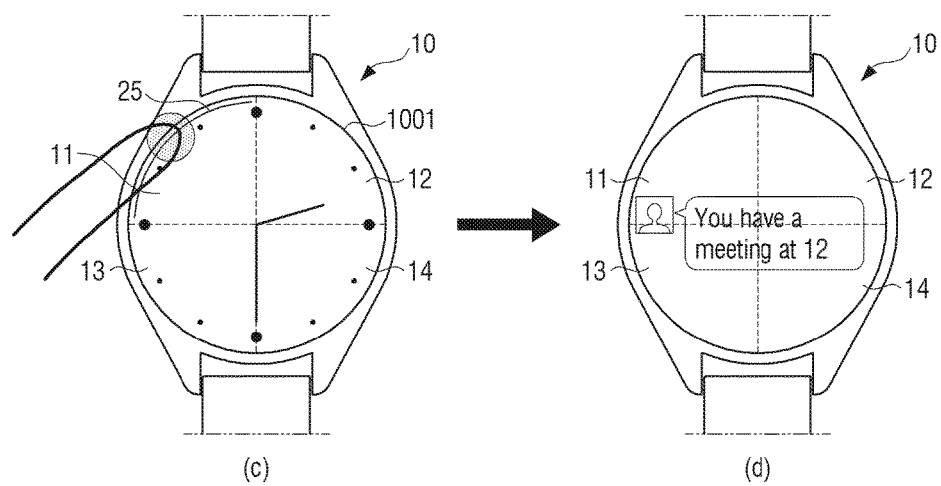

Next, when a user input is sensed on the inactivated display 130, the controller 190 controls the display 130 to display a watch screen 1001, as illustrated in view (c) of FIG. 10B. The watch screen 1001 may refer to initial screen or stand-by screen of the smart watch including the current time information (e.g., analogue time information using the hour and minute hands or digital time information using the number graphics). However, according to an exemplary embodiment, devices that can display the watch screen 1001 may not be limited to the smart watch; various types of the portable device 10 including the time information display function may display the watch screen 1001.

When the smart watch is converted from the off state to the on state, the display 130 of the smart watch may display the watch screen 1001 as initial screen of the smart watch. In this case, when a user input is sensed on the watch screen, the controller 190 may display the list or the identification information regarding the applications that can be implemented by the smart watch. Further, the controller 190 may display the notice information received by the smart watch. Further, when a user input is not sensed for a time while the smart watch is operating, the display 130 of the smart watch may display the watch screen 1001 as stand-by screen of the smart watch. In this case, when a user input is sensed on the watch screen, the controller 190 may display the list or the identification information regarding the applications that can be implemented by the smart watch. Further, the controller 190 may display the notice information received by the smart watch.

Herein, the watch screen 1001 may be divided into a plurality of areas 11-14 corresponding to a plurality of notice information. In other words, the watch screen 1001 may be divided into a plurality of areas 11-14 corresponding to the groups to which a plurality of notice information belong.

In this case, the controller 190 controls the display 130 to display the group notice information 25 on the area 11 corresponding to a group to which the notice information belong, among a plurality of areas 11-14. Next, the sensor 180 may sense a user input of selecting the group notice information.

When a user input is sensed, the controller 190 controls the display 130 to display the notice information, as illustrated in view (d) of FIG. 10B.

Figure 11A:
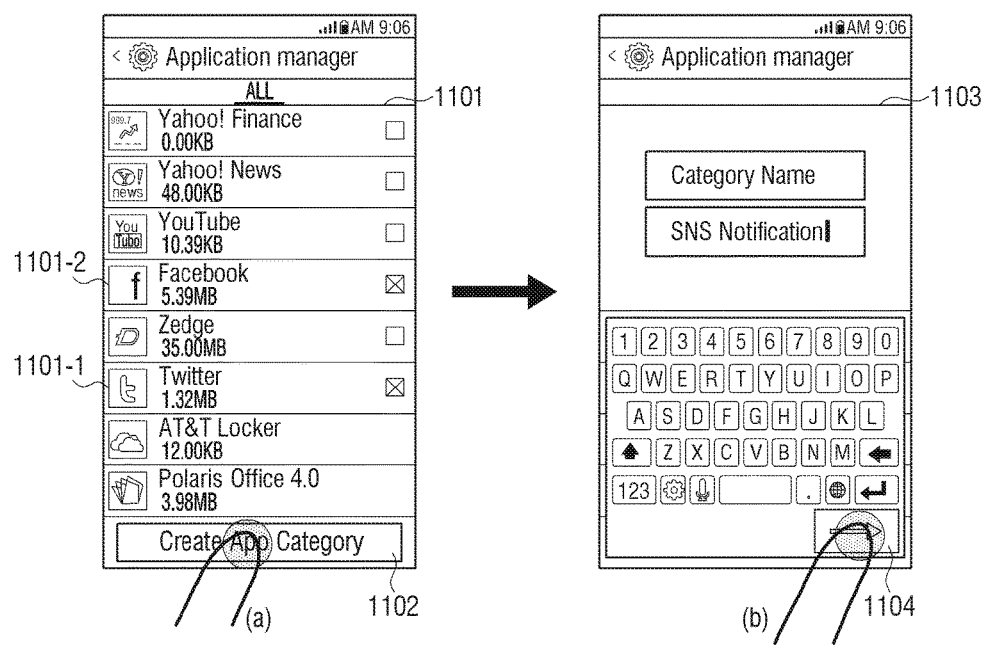
FIGS. 11A and 11B are diagrams illustrating a user interface screen to establish groups to which notice information belong, according to an exemplary embodiment.
Figure 11B:
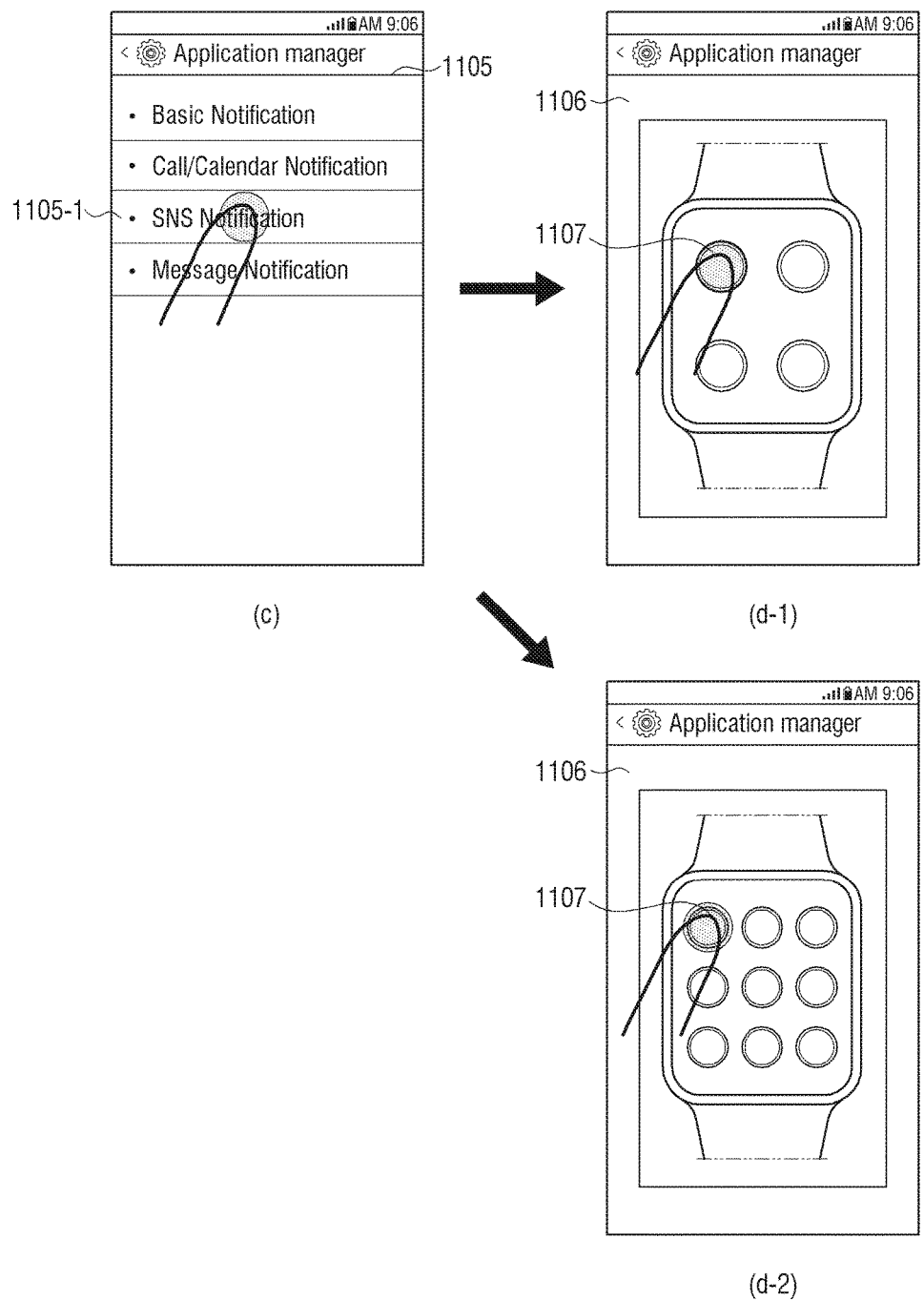

FIGS. 11A and 11B are diagrams illustrating a user interface screen to establish a group to which notice information belong, according to an exemplary embodiment.

Referring to view (a) of FIG. 11A, the controller 190 controls the display 130 to display an application list 1101 related with the notice information. The sensor 180 may sense a user input of selecting a UI element 1102 for creating a group to which the notice information provided by the application belong, while identification information 1101-1, 1101-2 of the application are selected from the application list 1101, as illustrated in view (a) of FIG. 11A.

When a user input is sensed, the controller 190 controls the display 130 to display the screen 1103 to receive the input of the group name, as illustrated in view (b) of FIG. 11A.

Next, the sensor 180 may a user input of entering the group name, and sense a user input of selecting a UI element 1104 for setting the name.

When a user input is sensed, the controller 190 controls the display 130 to display a group list 1105, as illustrated in view (c) of FIG. 11B. The group list 1105 may include the basic group, the call/schedule group, the social network service group and the message group for example. Next, the sensor 180 may sense a user input of selecting one group 1105-1 included in the group list.

When a user input is sensed, the controller 190 controls the display 130 to display a screen 1106 to determine the area corresponding to the group, as illustrated in view (d-1) or view (d-2) of FIG. 11B. Next, the sensor 180 may receive a user input of selecting an area 1107 corresponding to the selected group 1105-1.

When the notice information related with the application belonging to the selected group 1105-1 is received, the controller 190 may control the display 130 to display the group notice information on the area 1107 corresponding to the group 1105-1.

The controller 190 may activate the first area of the touch panel in the touch sensor 181 and inactivate the second area of the touch panel. The above operation may refer to that the controller 190 may process a touch input sensed through the first area of the touch panel and may not process a touch input sensed through the second area of the touch panel. Further, the above operation may refer to that the controller 190 may limit the electrical charging amount of the second area under a value so that a touch input on the second area of the touch panel is not sensed. Further, the above operation may refer to that the controller 190 may block the electrical power supply of the components related with the second area of the touch panel. Further, the above operation may include that the controller 190 may not process an outputting value or may not provide corresponding visual feedback even when the controller 190 receives a touch outputting signal generated in the touch sensor corresponding to the second area of the touch panel.

When the display 130 is combined with a touch screen in the layered structure by being coupled with the touch sensor 181, the controller 190 may control the first area of the touch screen to be activated and the second area of the touch screen to be inactivated.

Figure 12A:
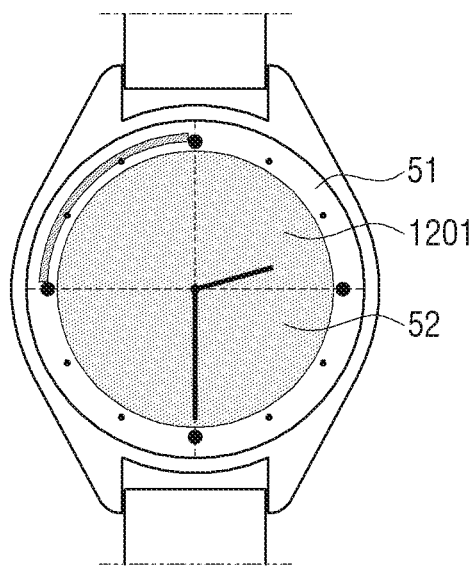
FIG. 12A is a diagram illustrating a watch screen displayed on a touch screen according to an exemplary embodiment.

FIG. 12A is a diagram illustrating a watch screen 1201 displayed on a touch screen according to an exemplary embodiment. Referring to FIG. 12A, the controller 190 controls an outer area 51 of the touch screen (or, boundary area) to be activated area, and controls an inner area 52 of the touch screen to be inactivated area. In this case, when a user touches the outer area 51, the controller 190 may perform the function related with the user interface on the touched area. When a user touches the inner area 52, the controller 190 may not perform processing regarding the user input.

Figure 12B:
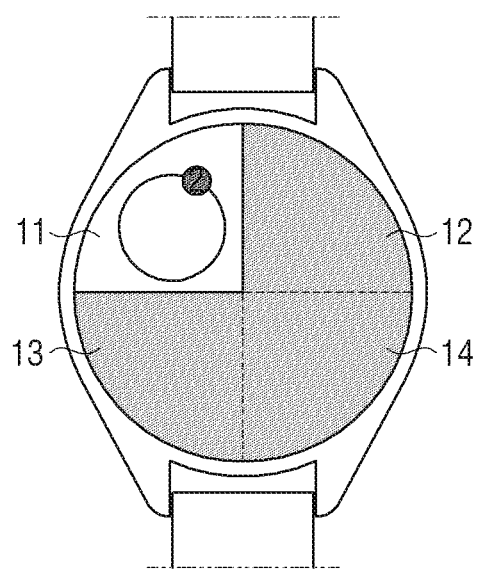
FIG. 12B is a diagram illustrating a display being divided into a plurality of areas corresponding to a plurality of groups according to an exemplary embodiment.

FIG. 12B is a diagram illustrating the display 130 being divided into the plurality of areas 11-14 corresponding to a plurality of groups according to an exemplary embodiment. Referring to FIG. 12B, the controller 190 activates the touch panel corresponding to one area 11 among the plurality of areas 11-14, and inactivates the touch panel corresponding to the other areas 12-14 among the plurality of areas 11-14.

In this case, when a user input is sensed through the touch panel corresponding to one area 11, the controller 190 may control the display 130 to display the notice information belonging to the group corresponding to the one area 11 or the notice information list. When a user touches the other areas 12-14, the controller 190 may not perform processing regarding the user input.

Figure 13A:
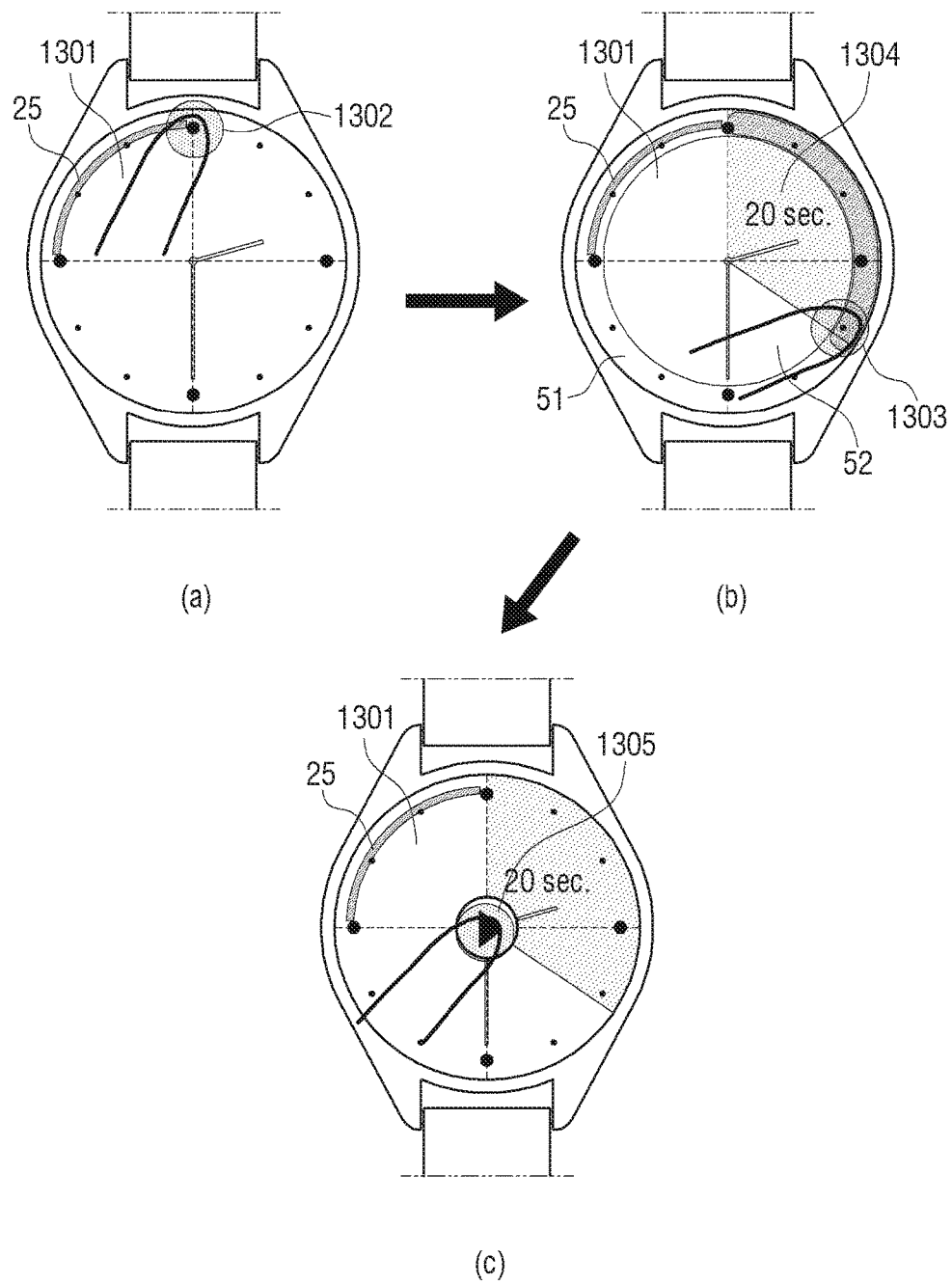
FIGS. 13A and 13B are diagrams illustrating a user interface screen in which a part of a touch screen is activated according to an exemplary embodiment.
Figure 13B:
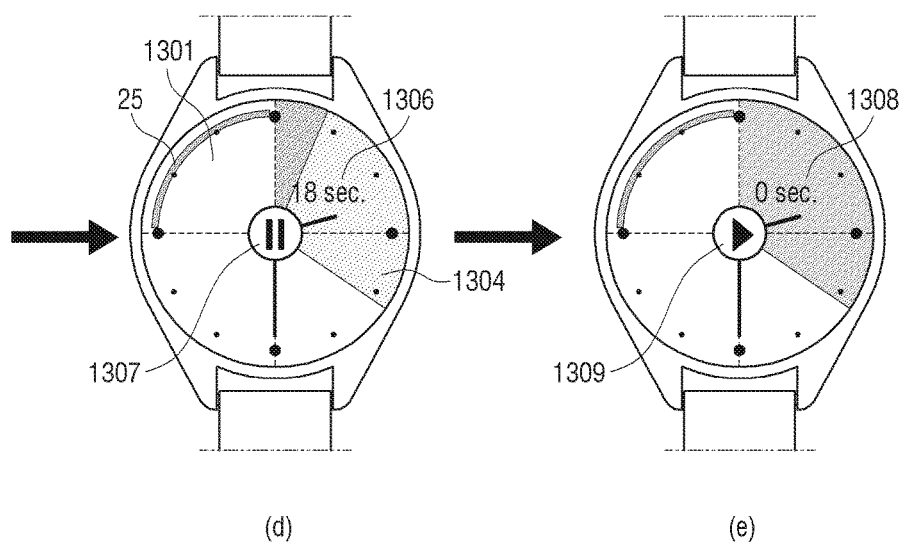

FIGS. 13A and 13B are diagrams illustrating a user interface screen in which a part of a touch screen is activated according to an exemplary embodiment.

Referring to view (a) of FIG. 13A, the controller 190 controls the display 130 to display a watch screen 1301.

The watch screen 1301 may include the hour and minute hands indicating the current time. Further, when the watch screen 1301 is divided into a plurality of areas corresponding to the groups to which a plurality of notice information belong, the controller 190 controls the display 130 to display the group notice information 25 on the area corresponding to the group to which the notice information belong. In this case, when a user input of selecting the group notice information 25 is sensed, the controller 190 may control the display 130 to display the notice information included in the group. Further, when a touch-drag input is sensed on the watch screen 1301, the controller 190 may control the display 130 to display the notice information recently received or the list of the applications that can be provided by the portable device 10.

Referring to the view (a) of FIG. 13A again, the sensor 180 may sense a user input of touching one area 1302 (e.g., outer area directed toward the twelve hours) on the touch screen.

When a user input is sensed, the controller 190 may perform a timer setting function, as illustrated in view (b) of FIG. 13A. When the timer setting function is performed, the controller 190 controls the outer area 51 of the watch screen 1301 to be activated area, and controls the inner area 52 of the watch screen 1301 to be inactivated area, as described above in FIG. 12A. Next, the sensor 180 may sense a user input of drawing and dragging an arc along the outer area 51 starting from the one area 1302. In this case, the inner area 52 may be inactivated area. Thus, when a user input is performed away from the outer area and dragged on the inner side, the controller 190 may not sense the dragged user input on the inner side or may not perform processing regarding the user input. The sensor 180 may sense a user input of dragging toward another area 1303 (e.g., the outer area directed toward the four hours). According to the user input, the controller 190 controls the display 130 to display a fan shaped area 1304 corresponding to the dragged size to be highlighted. Next, the sensor 180 may sense a user input of discontinuing the touch.

When a user input is sensed, the controller 190 may set the timer based on the dragged size, as illustrated in view (c) of FIG. 13A. For example, by assuming that the size of the dragging by 360° along the whole outer area of the watch screen 1301 is 60 seconds, the timer corresponding to the size of the dragging by 120° toward the four hours is 20 seconds. Next, the sensor 180 may sense a user input of selecting a UI element 1305 for starting the timer.

When a user input is sensed, the controller 190 starts the timer based on the time corresponding to the dragging size, as illustrated in view (d) of FIG. 13B. Herein, the controller 190 controls the display 130 to display the animation effects on the watch screen 1301 proportionally to the executed time of the timer. For example, the size of the fan shaped area 1304 is reduced proportionally to the executed time of the timer. Further, the color of the part in the fan shaped area 1304 may be modified proportionally to the executed time of the timer. Further, the controller 190 controls the display 130 to display a remaining time 1306 on the watch screen 1301. In this case, when a user input of selecting UI element 1307 for the short pausing is sensed, the controller 190 may pause the executed of the timer for a moment.

When the time of the timer completes, the controller 190 controls the display 130 to display a time 1308 indicating the timer completing time, as illustrated in view (e) of FIG. 13B. In this case, when a user input of selecting UI element 1309 for the restarting the timer is sensed, the controller 190 may start the timer again.

FIGS. 14A, 14B, 14C, 14D, and 14E are diagrams illustrating a user interface screen to register a schedule through a watch screen 1401 according to an exemplary embodiment.

Figure 14A:
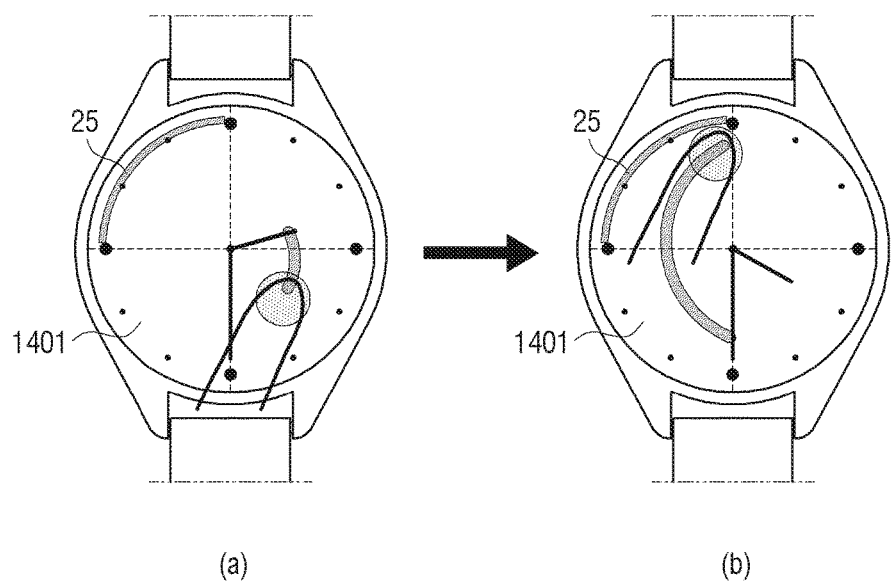
FIGS. 14A, 14B, 14C, 14D, and 14E are diagrams illustrating a user interface screen to register a schedule through a watch screen according to an exemplary embodiment.

Referring to view (a) of FIG. 14A, the watch screen 1401 includes the hour and minute hands indicating the current time. Further, while the watch screen 1401 is divided into a plurality of areas corresponding to the groups to which a plurality of notice information belong, the controller 190 controls the display 130 to display the group notice information 25 on the area corresponding to a group to which the notice information belong.

In the view (a) of FIG. 14A, a user may register the schedule. First, a user may register the time when the schedule starts. While the current time is displayed, the sensor 180 may sense a user input of discontinuing the touch on an area by touching and dragging the hour hand. In this case, the animation to move the hour hand with the moving of the touch position according to the dragging is displayed.

When a user input is sensed, the controller 190 controls the display 130 to move and display the hour hand on the area where the touch is lifted off, as illustrated view (b) of FIG. 14A. Next, the sensor 180 may sense a user input of discontinuing the dragging on an area by touching and dragging the minute hand. In this case, the animation to move the minute hand with the moving of the touch position according to the dragging is displayed.

Figure 14B:
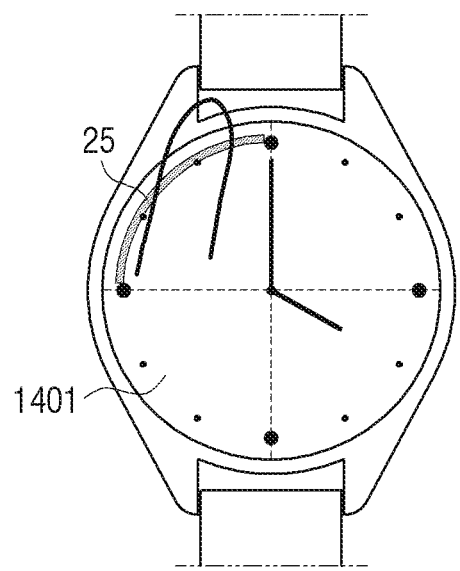

When a user input is sensed, the controller 190 controls the display 130 to move and display the minute hand on the area where the touch is lifted off, as illustrated in view (c) of FIG. 14B. Next, the sensor 180 may sense a user input of discontinuing the touch.

When a user input is sensed, the controller 190 controls the display 130 to display a pop up 1402 to request the completing time of the schedule, as illustrated in view (d) of FIG. 14B. Next, a user input may not be sensed for a time (e.g., one second).

Figure 14C:
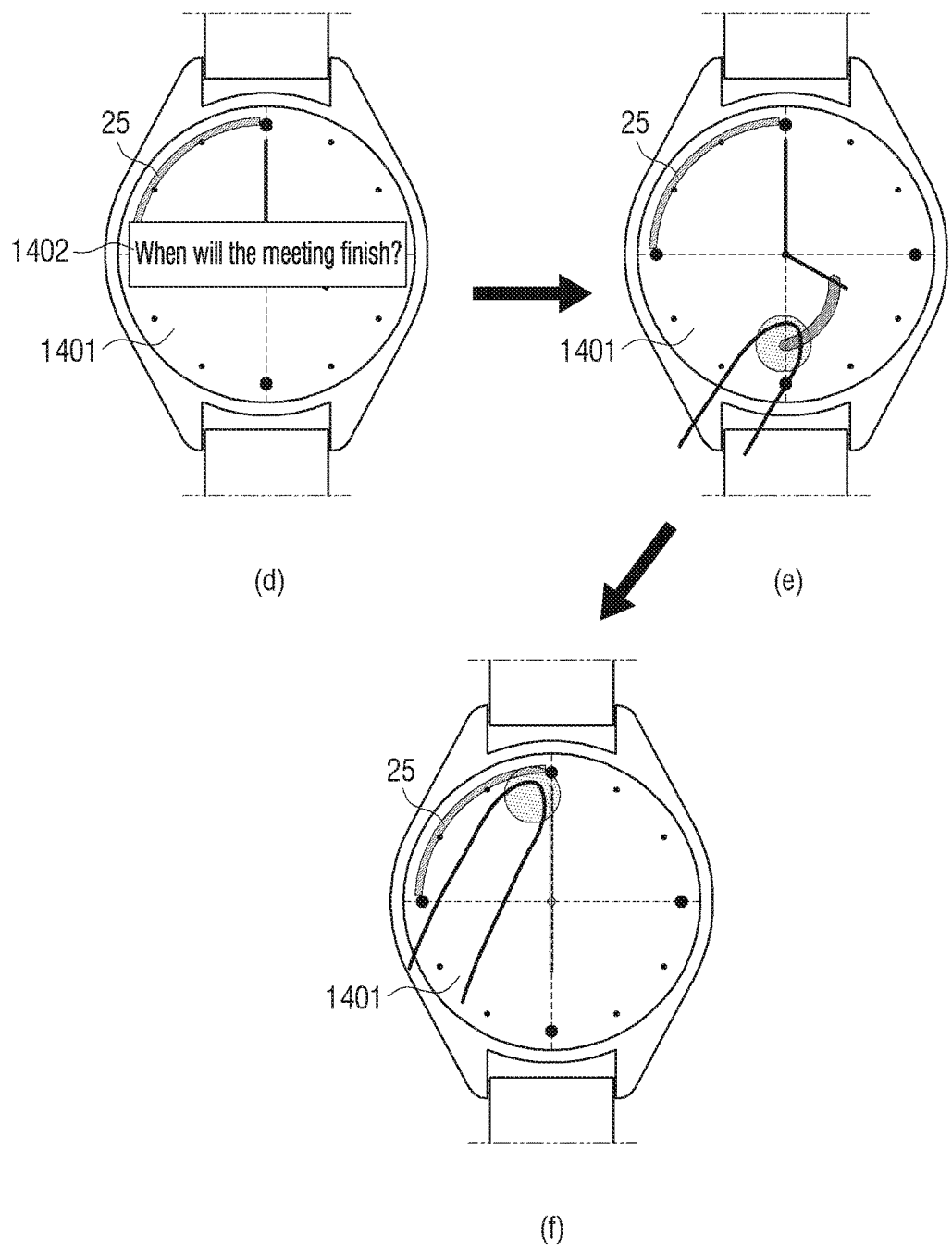

In this case, a user may register the completing time of the schedule, as illustrated in view (e) of FIG. 14C. While the starting time of the schedule is displayed, the sensor 180 may sense a user input of discontinuing the touch on a certain area by selecting and dragging the hour hand. In this case, the animation to move the hour hand with the moving of the touch position according to the dragging is displayed.

When a user input is sensed, the controller 190 controls the display 130 to move and display the hour hand on the area where the touch is lifted off, as illustrated in view (f) of FIG. 14C. Next, the sensor 180 may sense a user input of discontinuing the touch after touching the minute hand. This operation may refer to that a user may not request the moving of the minute hand. If a user wants to move the minute hand, the sensor 180 may sense a user input of discontinuing the dragging on a certain area by touching and dragging the minute hand.

Figure 14D:
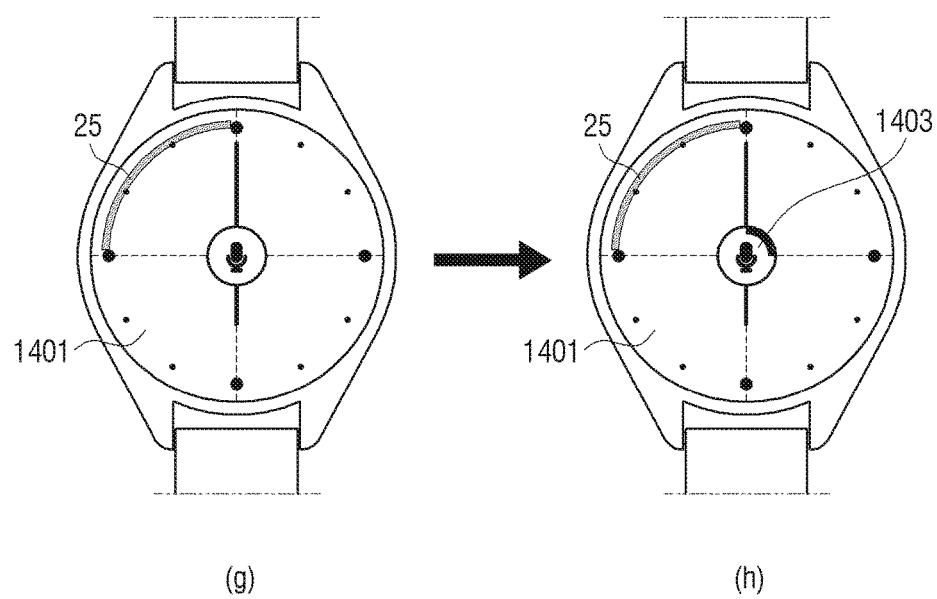

When a user input is sensed, the controller 190 may recognize a user voice related with the schedule descriptions through the microphone, as illustrated in view (g) of FIG. 14D. While the user voice is recognized, the controller 190 controls the display 130 to display a graphic 1403 indicating the time when the voice can be recognized, as illustrated in view (h) of FIG. 14D.

Figure 14E:
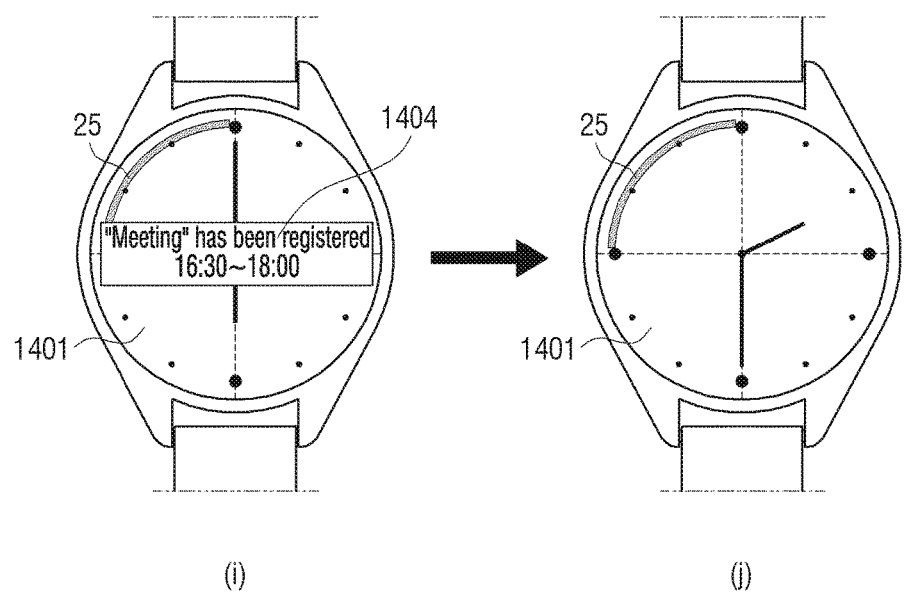

When the time to recognize the voice passes over, the controller 190 controls the display 130 to display a pop up 1404 informing that the schedule is registered, as illustrated in view (i) of FIG. 14E. Herein, the controller 190 controls the display 130 to display the animation indicating the starting time and the completing time of the schedule.

Next, when a time (e.g., one second) passes over, the controller 190 controls the display 130 to display the current time again, as illustrated in view (j) of FIG. 14E.

Figure 15A:
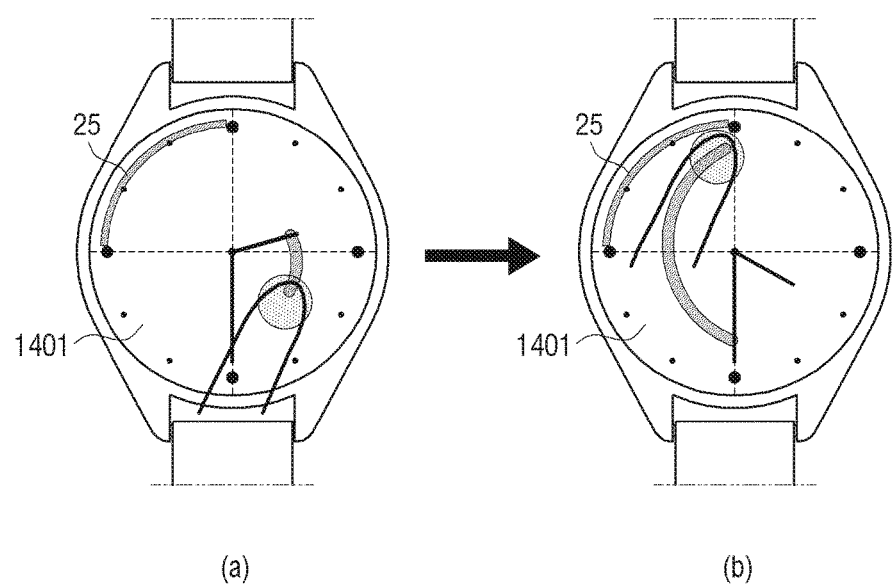
FIGS. 15A and 15B are diagrams illustrating a user interface screen to cancel a schedule registration through a watch screen according to an exemplary embodiment.
Figure 15B:
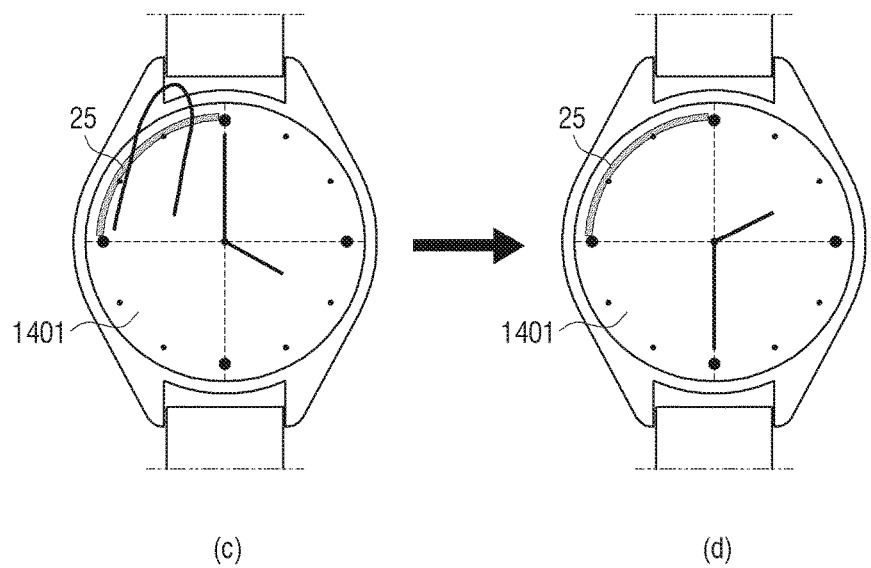

FIGS. 15A and 15B are diagrams illustrating a user interface screen canceling a schedule registration through the watch screen 1401 according to an exemplary embodiment.

Because views (a) and (b) of FIG. 15A correspond to the views (a) and (b) of FIG. 14A, the relevant explanation is not provided herein.

Referring to view (c) of FIG. 15B, the controller 190 controls the display 130 to move and display the minute hand on the area where the touch is lifted off. Next, a user input may not be sensed for a time (e.g., three seconds).

In this case, a user may cancel the schedule registration, as illustrated in view (d) of FIG. 15B. In this case, the controller 190 may control the display 130 to display the animation indicating the cancel of the schedule registration. For example, the animation to return the hour and minute hands from the starting time of the cancelled schedule to the current time is displayed.

Figure 16A:
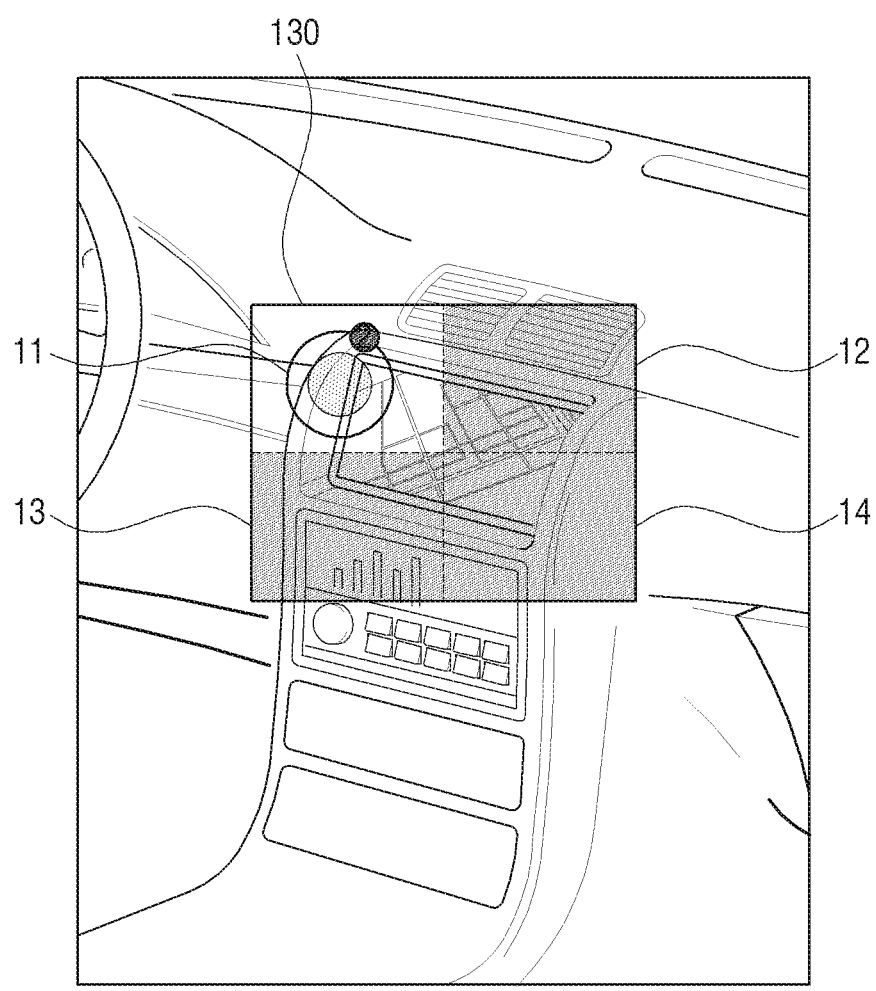
FIGS. 16A and 16B are diagrams illustrating various devices displaying notice information according to an exemplary embodiment.
Figure 16B:
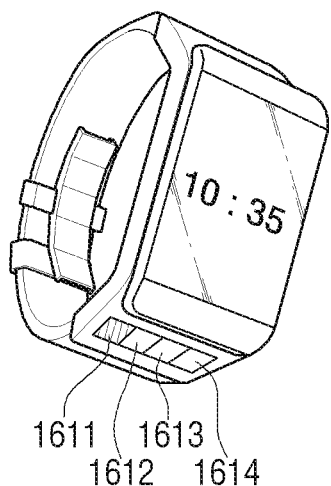

FIGS. 16A and 16B are diagrams illustrating various devices displaying notice information according to an exemplary embodiment.

Referring to FIG. 16A, the display 130 is installed at a driver seat of a car.

In the example mentioned above, the display 130 is divided into a plurality of areas 11-14 respectively corresponding to a plurality of notice information, as described above. Thus, the display 130 is divided into a plurality of areas 11-14 corresponding to a plurality of groups.

Herein, a car may sense the event related with the notice information, or receive the event related with the notice information from the portable device 10. In this case, a car activates the pixels included in the area 11 corresponding to the notice information. Further, a car inactivates the pixels included in the areas 12-14 not corresponding to the notice information. Next, a car may control the display 130 to display the group notice information 21 of a group to which the notice information belong, on the area 11 where the pixels are activated.

Further, as illustrated in FIG. 16B, a strap of the smart watch is equipped with a plurality of light emitters 1611-1614 (e.g., LED).

The plurality of light emitters 1611-1614 may be positioned adjacent to each other, or spaced away with each other by having an interval. Further, a plurality of light emitters 1611-1614 may emit different colors to each other. Further, a plurality of light emitters 1611-1614 may emit the light on the different frequencies to each other.

A plurality of light emitters 1611-1614 may correspond to a plurality of areas 11-14 corresponding to a plurality of groups according to an exemplary embodiment. Thus, the first light emitter 1611 may correspond to the first area 11, the second light emitter 1612 may correspond to the second area 12, the third light emitter 1613 may correspond to the third area 13, and the fourth light emitter 1614 may correspond to the fourth area 14.

Herein, when the smart watch senses the event related with the notice information belonging to one group among a plurality of groups, the smart watch may control the display 130 for the light emitter corresponding to the one group to emit the light. For example, the smart watch may emit the light emitter corresponding to one group with the first color, and may not emit the light emitters corresponding to the other groups. Further, the smart watch may emit the light emitter corresponding to the one group with the first frequency, and may not emit the light emitters corresponding to the other groups. Otherwise, the smart watch may emit the light emitters corresponding to the other groups with the second frequency different from the first frequency.

The portable device 10 may have various forms of feedbacks respectively regarding a plurality of groups. For example, the portable device 10 may provide different haptic feedbacks to each other respectively regarding a plurality of groups to which the notice information belong, when the event related with the notice information is sensed. Further, the portable device 10 may provide different audio effects to each other respectively regarding a plurality of groups to which the notice information belong, when the event related with the notice information is sensed.

FIGS. 17, 18, 19, and 20 are flowcharts illustrating a method for displaying notice information according to an exemplary embodiment.

Figure 17:
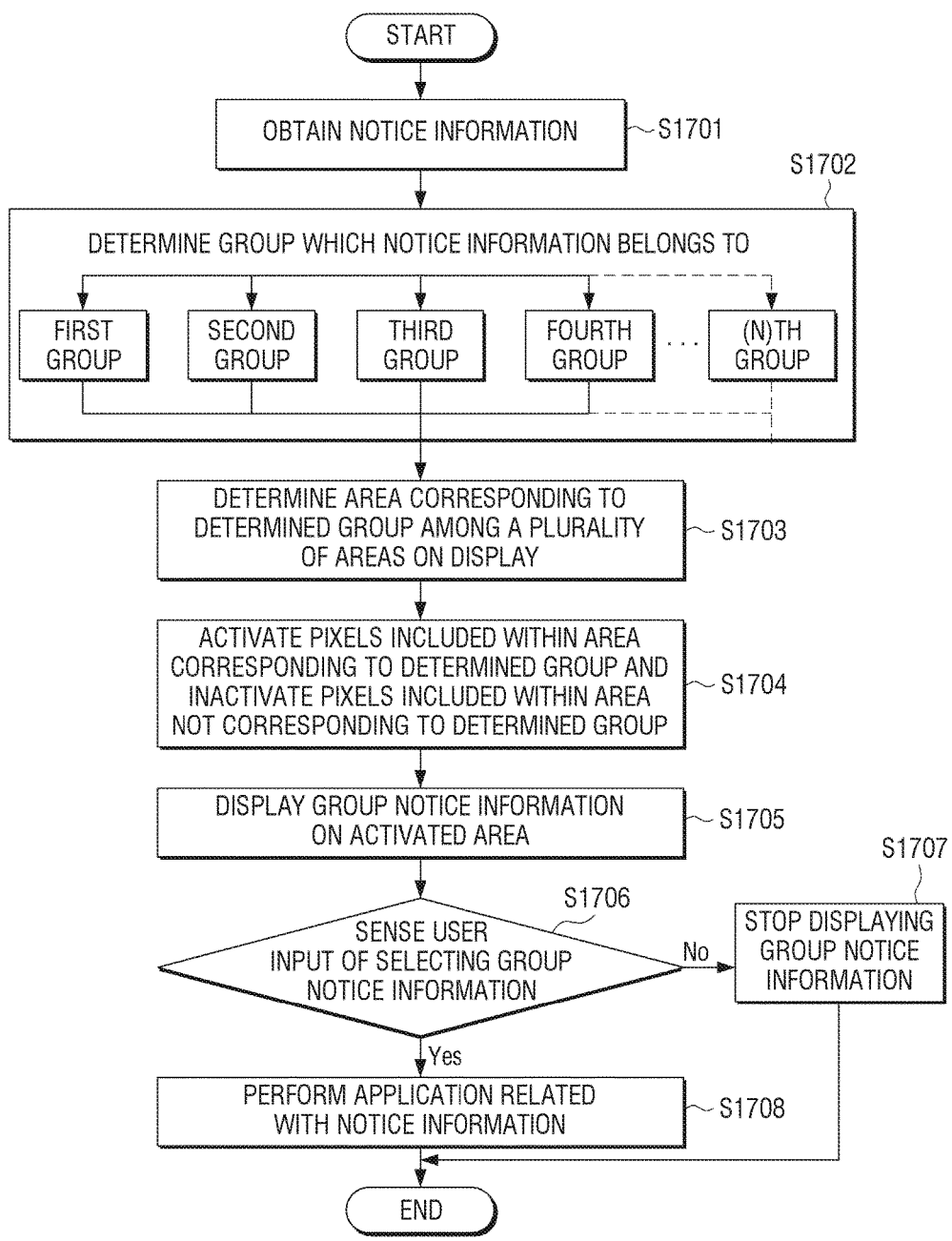
FIGS. 17, 18, 19, and 20 are flowcharts illustrating a method for displaying notice information according to an exemplary embodiment.

Referring to FIG. 17, in operation S1701, the portable device 10 obtains notice information.

In operation S1702, the portable device 10 determines a group to which the obtained notice information belongs to. For example, the portable device 10 may determine a group to which the notice information will belong, based on the type of the notice information. The first to the Nth group may be various groups representing the notice information. The examples regarding the groups are already described above, which may not be further explained below.

In operation S1703, the portable device 10 determines a pixel area corresponding to the determined group to which the notice information belong, among a plurality of pixel areas on the display 130. Further, the portable device 10 may determine the area of the touch panel corresponding to the determined pixel area.

In operation S1704, the portable device 10 activates pixels included within the determined pixel area corresponding to the determined group and the area of the touch panel corresponding to the determined pixel area. In this case, the portable device 10 inactivates pixels included within pixel areas corresponding to groups to which the notice information do not belong or a pixel area not corresponding to the determined group, on the display 130. Further, the areas of the touch panel corresponding to the inactivated pixel areas may be also inactivated.

In operation S1705, the portable device 10 displays the group notice information on the activated pixel area.

In operation S1706, the portable device 10 determines whether a user input of selecting the group notice information is sensed. If the portable device 10 determines that the user input is sensed, the portable device 10 continues in operation S1708. If the portable device 10 determines that the user input is not sensed when a time (e.g., three seconds) passes over, the portable device 10 continues in operation S1707.

In operation S1708, the portable device 10 performs execution of an application related with the notice information. For example, the portable device 10 may implement the application related with the notice information, and display the notice information on the application implementing screen.

In operation S1707, the portable device 10 stops the displaying the group notice information. Herein, the notice information may disappear with the fade-off effects.

Figure 18:
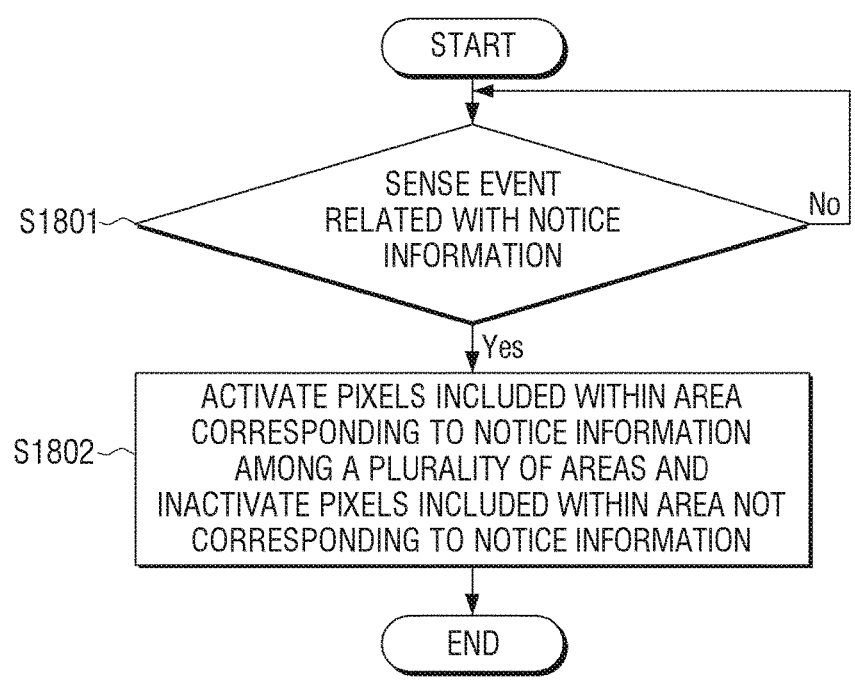

Referring to FIG. 18, in operation S1801, the portable device 10 determines whether an event related with notice information is sensed. If the portable device 10 determines that the event is sensed, the portable device 10 continues in operation S1802. Otherwise, the portable device 10 continues to perform operation S1801.

In operation S1802, the portable device 10 activates pixels included within an area corresponding to the notice information among the plurality of areas 11-14, and inactivate pixels included in areas not corresponding to the notice information.

Herein, the area corresponding to the notice information may be an area corresponding to a group to which the notice information belong.

Figure 19:
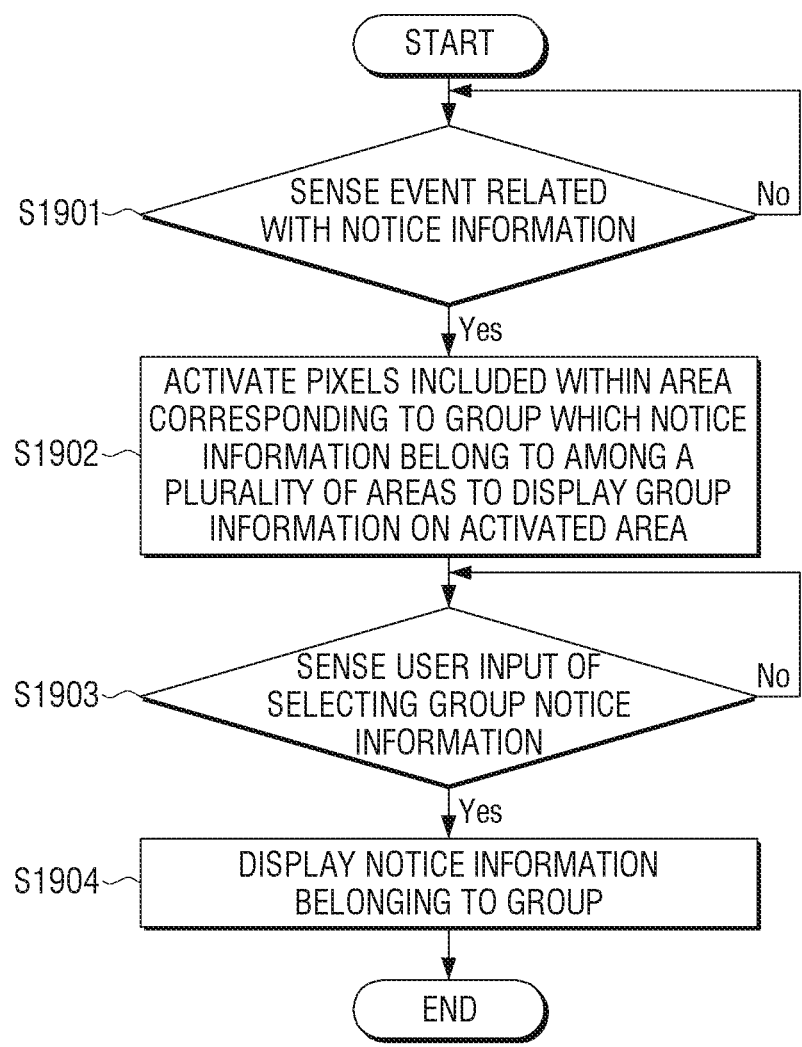

Referring to FIG. 19, in operation S1901, the portable device 10 determines whether an event related with notice information is sensed. If the portable device 10 determines that the event is sensed, the portable device 10 continues in operation S1902. Otherwise, the portable device 10 continues to perform operation S1901.

In operation S1902, the portable device 10 activates pixels included within an area corresponding to a group to which the notice information belong, among the plurality of areas 11-14, to display the group notice information on the activated area. Herein, the portable device 10 may inactivate pixels included in areas corresponding to groups to which the notice information do not belong, among the plurality of areas 11-14.

In operation S1903, the portable device 10 determines whether a user input of selecting the group notice information is sensed. If the portable device 10 determines that the user input is sensed, the portable device 10 continues in operation S1904. Otherwise, the portable device 10 continues to perform operation S1903.

In operation S1904, the portable device 10 displays the notice information belonging to the group on the area where the pixels are activated. Further, the portable device 10 may display a notice information list belonging to the group on the area where the pixels are activated.

Figure 20:
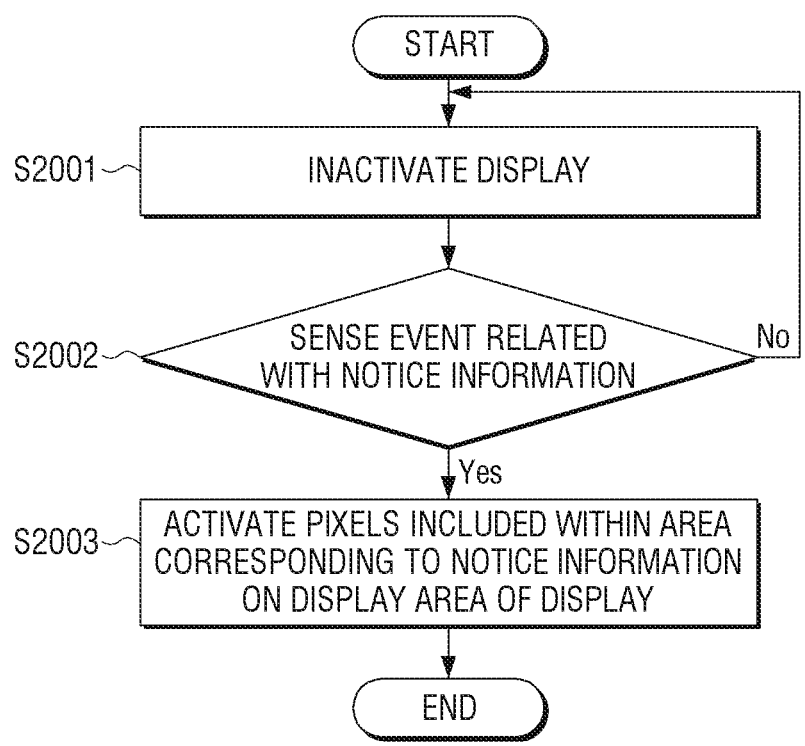

Referring to FIG. 20, in operation S2001, the portable device 10 inactivates the display 130 of the portable device 10. Herein, the inactivated display 130 may include a black screen state of the display 130, an off state of a display panel in the display 130, or a state displaying non information on the display 130. Further, the inactivated display 130 may include an off state of the portable device 10.

In operation S2002, while the display 130 is inactivated, the portable device 10 determines whether an event related with notice information is sensed. If the portable device 10 determines that the event is sensed, the portable device 10 continues in operation S2003. Otherwise, the portable device 10 returns to operation S2001.

In operation S2003, the portable device 10 activates pixels included within an area corresponding to the notice information on a display area of the display 130. Herein, the area corresponding to the notice information may be part of the display area. The portable device 10 may display the group notice information on the pixel activated area. Further, the portable device 10 may display the notice information on the pixel activated area. The portable device 10 may inactivate pixels included in areas not corresponding to the notice information on the display area.

Although the exemplary embodiments describe that the notice information is directly provided to the portable device 10, this is an exemplary embodiment. The notice information may be provided to the portable device 10 through another external portable device.

Figure 21:
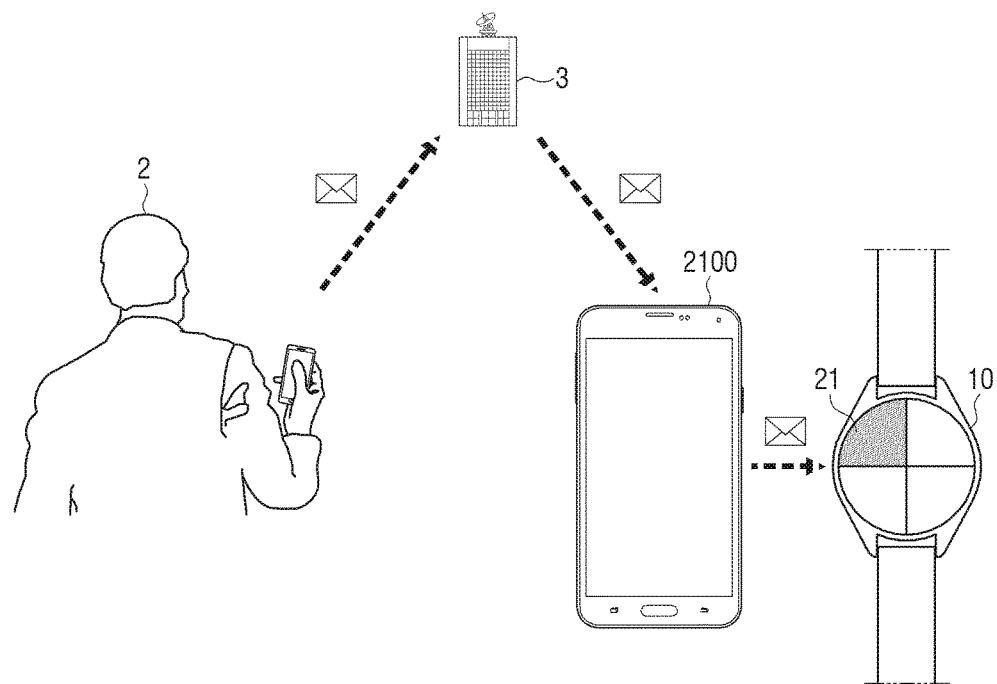
FIG. 21 is a diagram illustrating notice information provided through an external portable device according to another exemplary embodiment.

FIG. 21 is a diagram illustrating notice information provided through an external portable device 2100 according to another exemplary embodiment. According to an exemplary embodiment, the portable device 10 may be wearable device such as smart watch, and the external portable device 2100 may be a mobile device such as a smart phone or a tablet device.

Referring to FIG. 21, when the other user 2 transmits a message to the user 1, the message may be transmitted to the external portable device 2100 through the station 3. In this case, the external portable device 2100 may transmit the event information indicating the arrival of the message to the connected portable device 10. In response to the received event, the portable device 10 may determine the area corresponding to a group to which the message belongs among a plurality of areas. Further, the portable device 10 may activate pixels included in the determined area, and display the group notice information 21 of the group to which the message belongs on the determined area to display the arrival of the message.

As described above, the user may confirm whether the event occurs and the event type more quickly by transmitting the event occurring information from the mobile device such as a smart phone to the wearable device such as a smart watch. Thereafter, when the user selects the group notice information, the user may be provided with the notice information through the portable device 10 or the external portable device 2100.

Further, the exemplary embodiments describe that the mapping information is stored in the portable device 10, this is an exemplary embodiment. The mapping information may be shared with the external device by registering the mapping information on the server.

Figure 22:
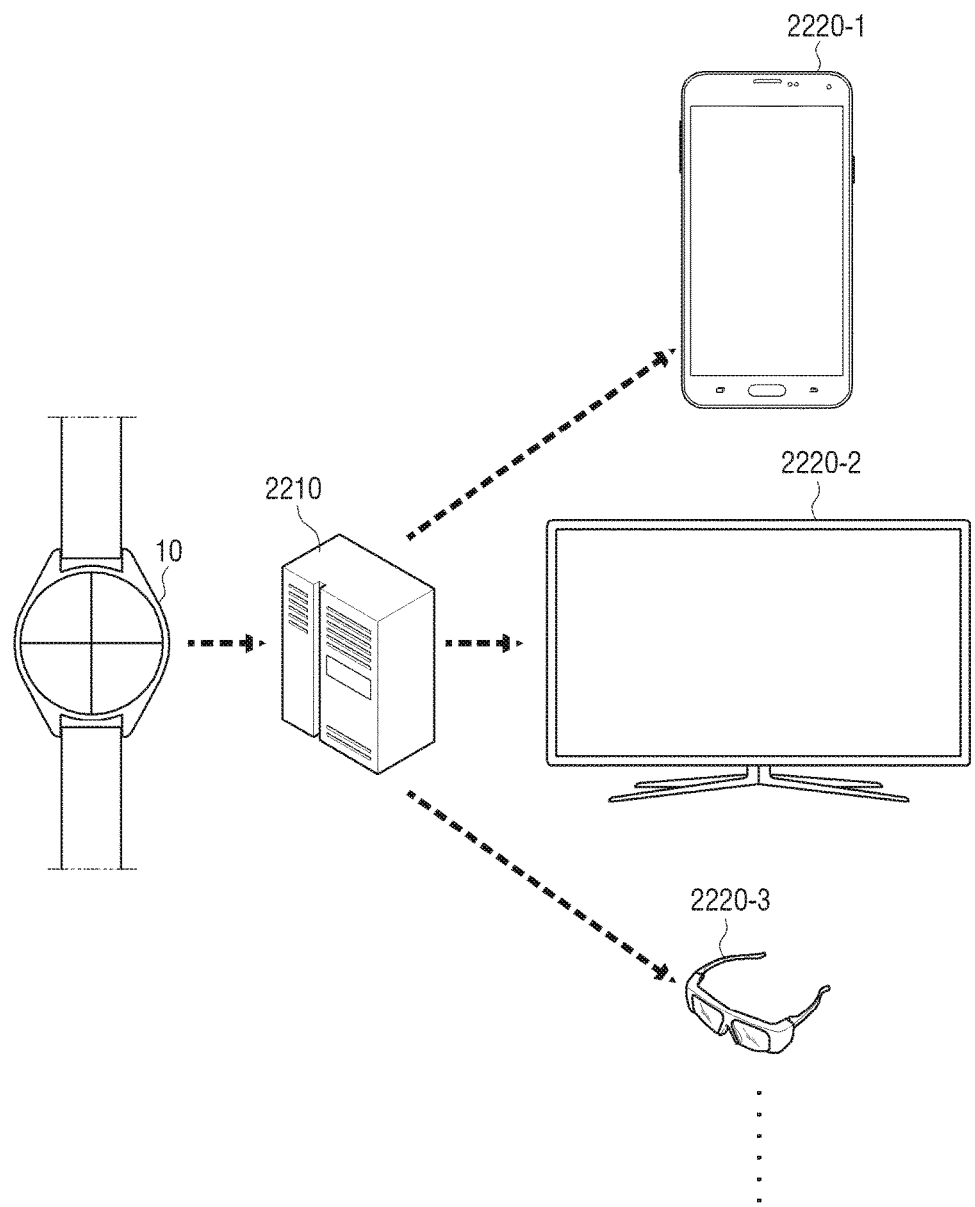
FIGS. 22 and 23 are a diagram and a sequence diagram, each illustrating mapping information registered by a server and provided to an external device according to an exemplary embodiment.
Figure 23:
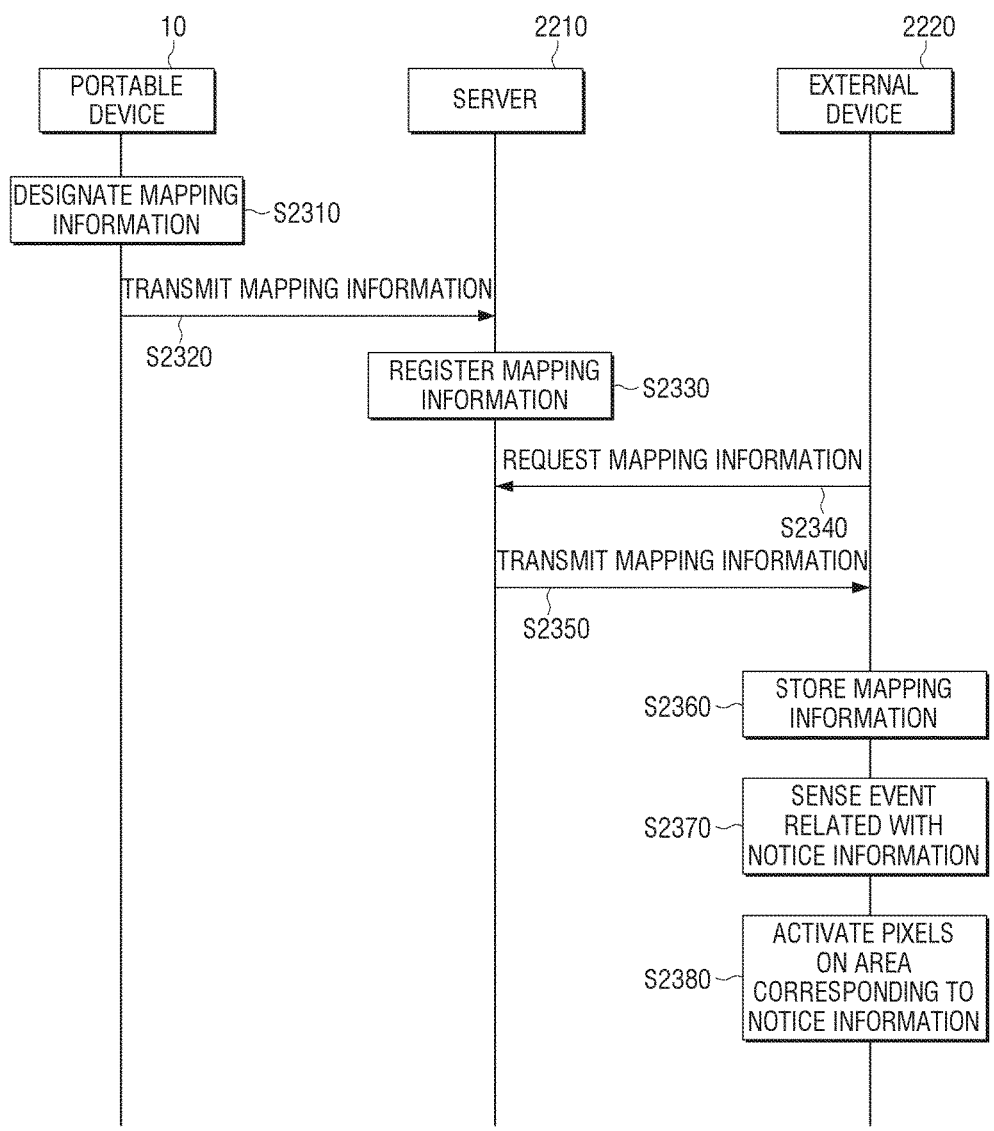

FIGS. 22 and 23 are a diagram and a sequence diagram, each illustrating mapping information registered by a server 2210 and provided to an external device according to an exemplary embodiment.

Referring to FIG. 22, the portable device 10 may store the mapping information in which a plurality of areas are mapped with a plurality of groups to which the notice information belong, on the memory 150. Herein, the mapping information between a plurality of areas and a plurality of groups may be designated through the user interface. Further, the portable device 10 may transmit the mapping information to the server 2210. The server 2210 may store the transmitted mapping information. Further, the server 2210 may transmit the stored mapping information to other external devices 2220-1 to 2220-3 according to the requests of the other external devices 2220-1 to 2220-3. Herein, the external devices 2220-1 to 2220-3 may include the display apparatus such as a wide screen of a TV and the wearable device such as smart glasses, in addition to the portable device such as a smart phone.

Referring to FIG. 23, in operation S2310, the portable device 10 stores or designates mapping information. Herein, the mapping information may be designated according to the user input received through the user interface.

In operation S2320, the portable device 10 transmits the designated mapping information to the server 2210. Herein, the mapping information may include the user information of the portable device 10 (e.g., ID information).

In operation S2330, the server 2210 registers the received mapping information. Herein, the server 2210 may store the mapping information and the user information together.

In operation S2340, the external device 2220 requests the mapping information from the server 2210. Herein, the request may include the user information of the external device 2220.

In operation S2350, the server 2210 transmits the mapping information to the external device 2220 in response to the request. The server 2210 may determine whether there is mapping information registered by a user identified to be a user of the external device 2220 based on the user information included in the request. When there is mapping information registered by a user identified to be a user of the external device 2220, the server 2210 may transmit the registered mapping information to the external device 2220.

In operation S2360, the external device 2220 stores the received mapping information.

In operation S2370, the external device 2220 senses an event related with notice information.

In operation S2380, the external device 2220 activates pixels on an area corresponding to the notice information in response to the sensing of the event. Herein, the external device 2220 may inactivate pixels included in areas corresponding to groups to which the notice information do not belong.

As described above, a user may share the designated mapping information with another external device by registering the mapping information on the server 2210 and sharing with the other external device 2220. Thus, the uniform user experiences can be provided through a plurality of devices.

Further, although the exemplary embodiments describe that the screen is divided into a number of the areas regardless of a number of the group notice information, this is an exemplary embodiment. According to a number of the group notice information, the screen may be adaptively divided to display the notice information.

Figure 24:
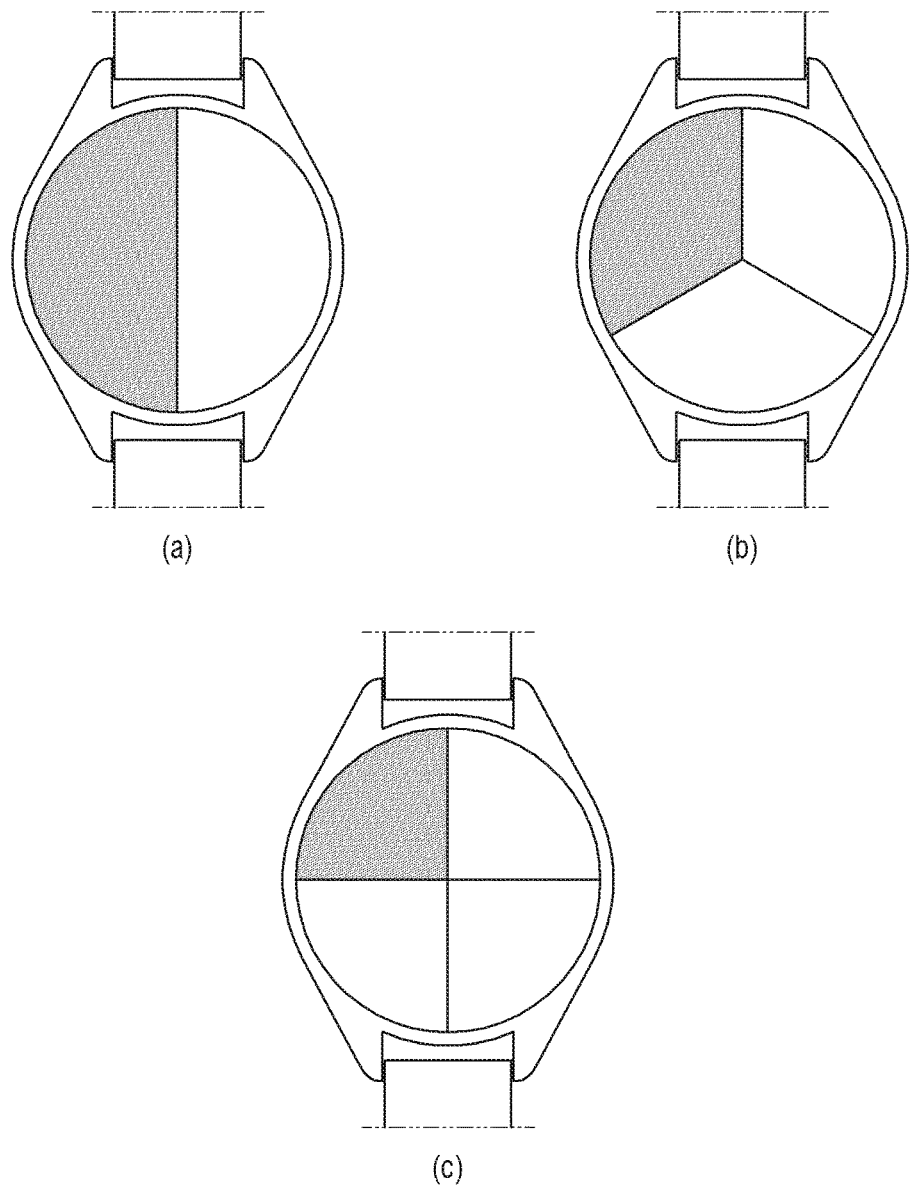
FIG. 24 is a diagram illustrating a screen divided according to a number of group notice information, according to an exemplary embodiment.

FIG. 24 is a diagram illustrating a screen divided according to a number of group notice information according to an exemplary embodiment.

When the portable device 10 is a smart watch including the circular shape of the display 130, and when two group notice information are designated through the environment setting, the portable device 10 divides the display 130 into two areas, and may map the group notice information respectively on the two areas, as illustrated in view (a) of FIG. 24. Further, when three group notice information are designated, the portable device 10 divides the display 130 into three areas, and may map the group notice information respectively on the three areas, as illustrated in view (b) of FIG. 24. Further, when four group notice information are designated, the portable device 10 divides the display 130 into four areas, and may map the group notice information respectively on the four areas, as illustrated in view (c) of FIG. 24.

As described above, the display 130 may be adaptively divided according to a number of the designated group notice information. Thus, a user can confirm the number of the group notice information designated by him in addition to the types of the group notice information.

In addition, the exemplary embodiments may also be implemented through computer-readable code and/or instructions on a medium, e.g., a computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and examples are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A portable device configured to provide notice information, the portable device comprising:
a display configured to be divided into at least two areas, each area corresponding to a group, among a plurality of groups, to which notice information belongs; and
a controller configured to:
while the display is divided into the at least two areas, sense a first notification event comprising a first notice information;
based on the first notice information in the first notification event, determine which group among the plurality of groups the first notice information belongs;
control the display to activate pixels included in a first area corresponding to the group to which the first notice information in the first notification event belongs while inactivating all the pixels in each area corresponding to each group to which the first notice information in the first notification event does not belong,
sense a second notification event comprising a second notice information while the display activates pixels included in the first area corresponding to the group to which the first notice information belongs;
control the display to inactivate pixels included in the first area corresponding to the group to which the first notice information belongs; and
control the display to activate pixels included in a second area corresponding to the group to which the second notice information in the second notification event belongs, wherein the controller is further configured to control the display to display group notice information of a group to which the first notice information and the second notice information belongs, in the area comprising the activated pixels.

2. The portable device of claim 1, wherein a number of the areas is equal to a number of groups of notice information.

3. The portable device of claim 1, wherein the plurality of groups comprise at least two from among a basic group, a private group, a public group, a social network service group, a message group, and a schedule group.

4. The portable device of claim 1, wherein the first notice information and the second notice information comprise at least one among an application for processing the first notice information and the second notice information, an importance of the first notice information and the second notice information, a size of the first notice information and the second notice information, a sender of the first notice information and the second notice information, descriptions of the first notice information and the second notice information, and a data type of the first notice information and the second notice information.

5. The portable device of claim 1, further comprising a memory configured to store mapping information between types of notice information and the groups to which the types of notice information respectively belong,
wherein the controller is further configured to control the display to activate the pixels included in the first area corresponding to the first notice information and the second area corresponding to the second notice information, based on the mapping information.

6. The portable device of claim 1, wherein the first notice information and the second notice information comprises at least one among call reception information, text message information, e-mail message information, instant message information, social service information, alarm information, timer information, battery information, and schedule information.

7. The portable device of claim 1, wherein the group notice information comprises at least one among a graphic representing the group, a number of notice information belonging to the group, a number of notice information un-read by a user and belonging to the group, a name of the group, an initial of the group, a nickname of the group, an image related with the group, and an animation related with the group.

8. The portable device of claim 1, further comprising a sensor configured to sense a user input of selecting the group notice information,
wherein the controller is further configured to control the display to display the first notice information and the second notice information belonging to the group, in response to the sensor sensing the user input.

9. The portable device of claim 1, further comprising a sensor configured to sense a user input of selecting the group notice information,
wherein the controller is further configured to control the display to display a list of notice information belonging to the group, in response to the sensor sensing the user input.

10. A method of providing notice information of a portable device, the method comprising:
dividing a display into at least two areas, each area corresponding to a group, among a plurality of groups, to which notice information belongs;
while the display is divided into the at least two areas, sensing a first notification event corresponding to a first notice information;
based on the first notice information in the first notification event, determining which group among the plurality of groups the first notice information belongs;
activating pixels included in a first area corresponding to the group to which the first notice information in the first notification event belongs while inactivating all the pixels in each area corresponding to each group to which the first notice information in the first notification event does not belong;
sensing a second notification event comprising a second notice information while the display activates pixels included in the first area corresponding to the group to which the first notice information belongs;
controlling the display to inactivate pixels included in the first area corresponding to the group to which the first notice information belongs;
controlling the display to activate pixels included in a second area corresponding to the group to which the second notice information in the second notification event belongs; and
displaying group notice information of a group to which the first notice information and the second notice information belongs in the area comprising the activated pixels.

11. The notice information providing method of claim 10, wherein a number of the areas is equal to a number of groups of notice information.

12. The notice information providing method of claim 10, wherein the first notice information and the second notice information comprise at least one among an application for processing the first notice information and the second notice information, an importance of the first notice information and the second notice information, a size of the first notice information and the second notice information, a sender of the first notice information and the second notice information, descriptions of the first notice information and the second notice information, and a data type of the first notice information and the second notice information.

13. The notice information providing method of claim 10, further comprising storing mapping information between types of notice information and the groups to which the types of notice information respectively belong,
wherein the activating comprises activating the pixels included in the first area corresponding to the first notice information and the second area corresponding to the second notice information, based on the mapping information.

14. The notice information providing method of claim 10, wherein the first notice information and the second notice information comprise at least one among call reception information, text message information, e-mail message information, instant message information, social service information, alarm information, timer information, battery information, and schedule information.

15. The notice information providing method of claim 10, wherein the group notice information comprises at least one among a graphic representing the group, a number of notice information belonging to the group, a number of notice information un-read by a user and belonging to the group, a name of the group, an initial of the group, a nickname of the group, an image related with the group, and an animation related with the group.

16. The notice information providing method of claim 10, further comprising:

sensing a user input of selecting the group notice information; and displaying a list of notice information belonging to the group, in response to the sensing the user input.

17. A portable device configured to provide notice information, the portable device comprising:
a display configured to be divided into at least two areas, each area corresponding to a group, among a plurality of groups, of notice information; and
a controller configured to:
while the display is divided into the at least two areas, obtain a first notice information;
based on the first notice information, determine the group to which the obtained first notice information belongs among the groups of notice information;
determine a first area corresponding to the group to which the first notice information belongs;
control the display to activate pixels included in the first area corresponding to the group to which the first notice information belongs while inactivating all the pixels in each area corresponding to each group to which the first notice information does not belong;
obtain a second notice information while the display activates pixels included in the first area corresponding to the group to which the first notice information belongs;
control the display to inactivate pixels included in the first area corresponding to the group to which the first notice information belongs;
control the display to activate pixels included in a second area corresponding to the group to which the second notice information belongs; and
display group notice information of the determined group in the first area and the second area comprising the activated pixels.

18. The portable device of claim 17, wherein a number of the areas is equal to a number of the groups of notice information.

* * * * *